(12) United States Patent
Tolba et al.

(10) Patent No.: US 11,888,824 B2
(45) Date of Patent: Jan. 30, 2024

(54) METHODS, APPARATUSES, AND COMPUTER-READABLE STORAGE MEDIA FOR SECURE END-TO-END GROUP MESSAGING AMONG DEVICES USING DYNAMIC GROUPING

(71) Applicant: HUAWEI TECHNOLOGIES CO., LTD., Guangdong (CN)

(72) Inventors: Mohamed Tolba, Kitchener (CA); Ahmed Abdelkhalek, Kitchener (CA); Teng Wu, Waterloo (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 51 days.

(21) Appl. No.: 17/566,841

(22) Filed: Dec. 31, 2021

(65) Prior Publication Data

US 2023/0216832 A1 Jul. 6, 2023

(51) Int. Cl.
*H04L 9/40* (2022.01)
(52) U.S. Cl.
CPC .................................. *H04L 63/04* (2013.01)
(58) Field of Classification Search
CPC ....... H04L 63/04; H04L 63/06; H04L 63/062; H04L 63/064; H04L 63/065
See application file for complete search history.

(56) References Cited

U.S. PATENT DOCUMENTS

| | | | | |
|---|---|---|---|---|
| 6,240,188 B1 * | 5/2001 | Dondeti | ............... | H04L 63/0823 380/278 |
| 6,684,331 B1 * | 1/2004 | Srivastava | ............ | H04L 12/185 713/168 |
| 7,650,424 B2 * | 1/2010 | Armitage | ............ | H04L 63/0272 709/225 |
| 8,289,883 B2 * | 10/2012 | Zhu | ........................ | H04W 40/28 370/312 |
| 10,965,653 B2 * | 3/2021 | Bild | ...................... | H04L 9/3255 |
| 11,558,192 B2 * | 1/2023 | Auh | ...................... | H04L 9/0836 |

* cited by examiner

*Primary Examiner* — Hosuk Song
(74) *Attorney, Agent, or Firm* — Locke Lord LLP; Tim Tingkang Xia, Esq.

(57) ABSTRACT

An end-to-end group messaging method or apparatus organizes a plurality of local groups of members into local-group (LG) trees and a public-group (PG) tree. Each tree has a plurality of nodes including a root node connecting to a plurality of leaf nodes. Each LG tree corresponds to a local group. Each member of a local group is associated with a leaf node of the corresponding LG tree. Each LG tree is associated with a leaf node of the PG tree. Members of a same local group may establish communication therebetween by using a group key associated with the root node of the LG tree of the local group. Members of all local groups may establish communication therebetween by using a group key associated with the root node of the PG tree.

20 Claims, 14 Drawing Sheets

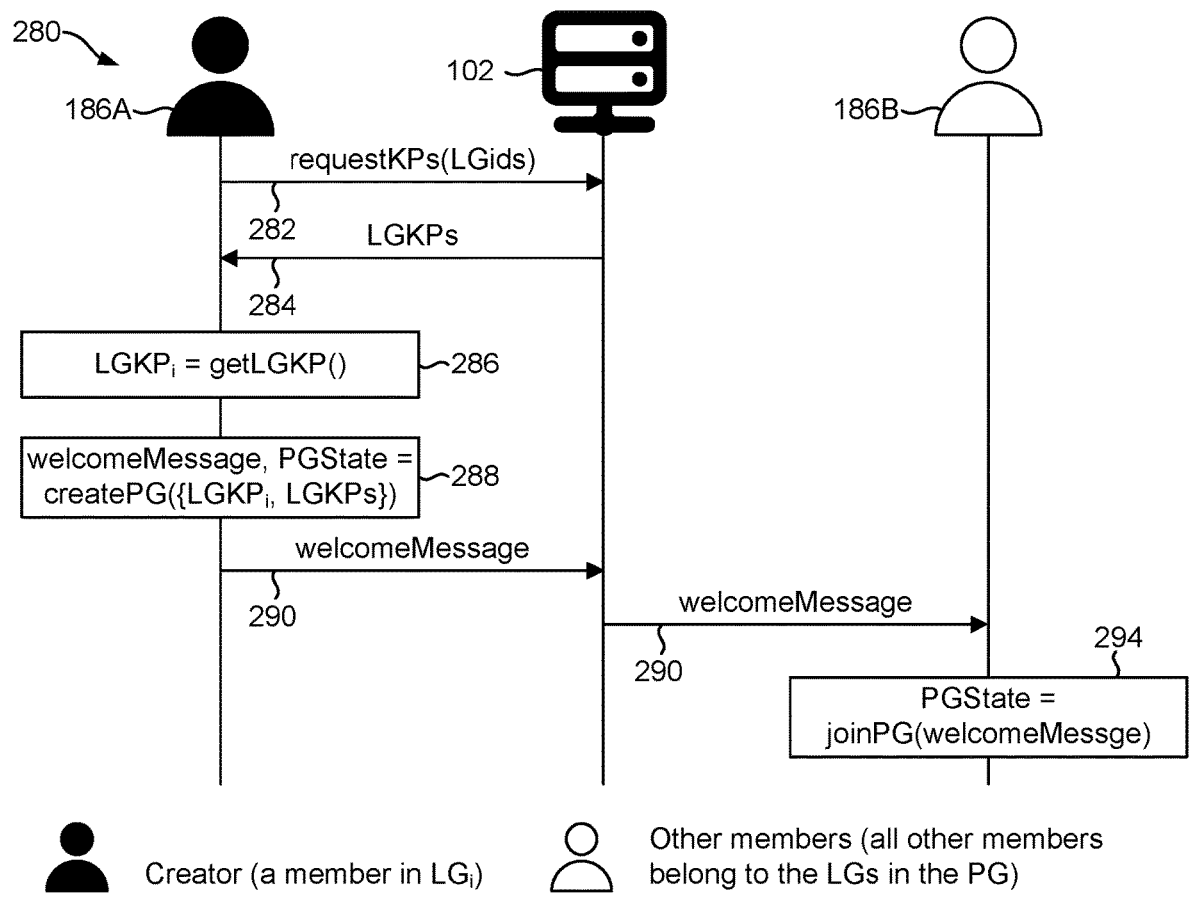
FIG. 9
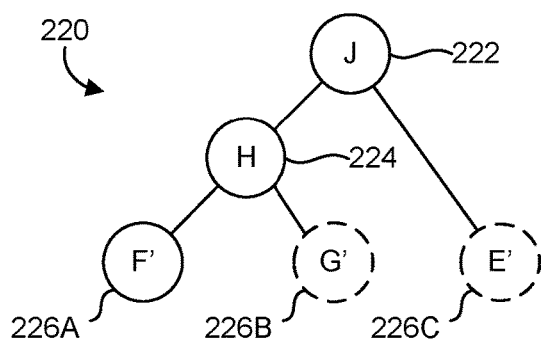
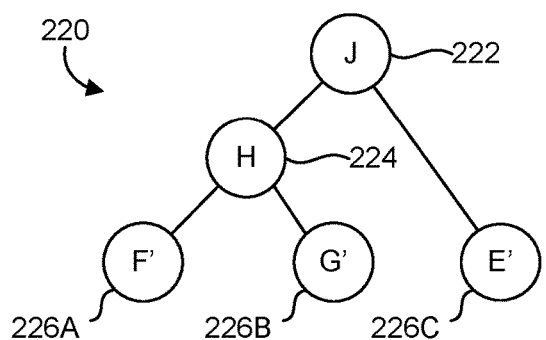
FIG. 10A  FIG. 10B

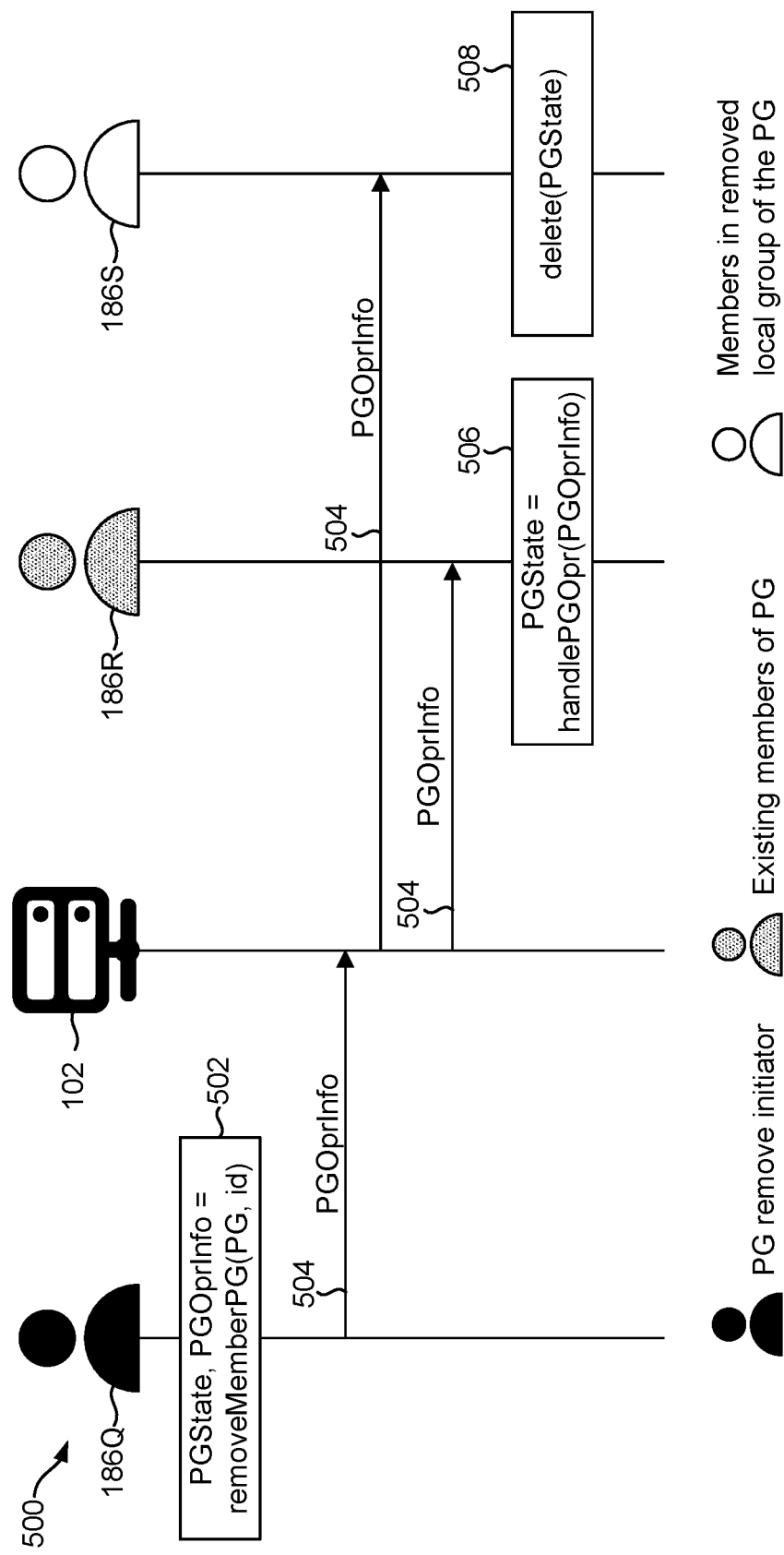

METHODS, APPARATUSES, AND COMPUTER-READABLE STORAGE MEDIA FOR SECURE END-TO-END GROUP MESSAGING AMONG DEVICES USING DYNAMIC GROUPING

FIELD OF THE DISCLOSURE

The present disclosure relates to methods, apparatuses, and computer-readable media for secure end-to-end group messaging among a plurality of computing devices, and in particular to methods, apparatuses, and computer-readable media for secure end-to-end group messaging among a plurality of computing devices using dynamic grouping.

BACKGROUND TO THE DISCLOSURE

End-to-End Encryption (E2EE) is a security measure being increasingly adopted to ensure that confidential information is only accessible to the communicating parties and not to any intermediate nodes. While key material establishment can provide such protection, it is challenging to implement, especially in dynamic group settings. Two common approaches for facilitating key material establishment in a group setting are pairwise key agreement and sender keys. However, both have their limitations that include poor scalability as the group size increases as well as the failure to achieve state-of-the-art security properties such as forward secrecy (FS) and post-compromise security (PCS). With FS and PCS, both prior and future communications within the group are protected, irrespective of when the communication channel is compromised.

SUMMARY

Embodiments disclosed herein relate to methods, apparatuses, and computer-readable media for secure end-to-end group messaging among a plurality of client computing devices of a computer network system. According to one aspect of this disclosure, the methods, apparatuses, and computer-readable media use a two-tier architecture to organize a plurality of members (such as the plurality of client computing devices) into a plurality of local-group (LG) trees and a public-group (PG) tree for end-to-end group messaging. Each tree has a plurality of nodes including a root node connecting to a plurality of leaf nodes. Each LG tree corresponds to a local group. Each member of a local group is associated with a leaf node of the corresponding LG tree and has a first path from the corresponding leaf node of the LG tree to the root node thereof. Each LG tree is associated with a leaf node of the PG tree and has a path from the corresponding leaf node of the PG tree to the root node thereof. Members of a same local group may establish communication therebetween by using a group key associated with the root node of the LG tree of the local group. Members of all local groups may establish communication therebetween by using a group key associated with the root node of the PG tree.

According to one aspect of this disclosure, there is provided a method of end-to-end group messaging, the method comprising: storing a first local-group (LG) tree in a memory of a first member of a first local group, the first local group comprising the first member and at least one other member, the first LG tree comprising a plurality of LG nodes, the plurality of LG nodes comprising a LG root node connecting to a plurality of LG leaf nodes, the LG root node associated with a LG group key of the local group, and each of the first member and the at least one other member associated with a respective one of the LG leaf nodes and having a first path from the corresponding LG leaf node to the LG root node; storing, in the memory of the first member, a public-group (PG) tree for a public group, the public group comprising the first local group and at least one other local group, the PG tree comprising a plurality of PG nodes, the plurality of PG nodes comprising a PG root node connecting to a plurality of PG leaf nodes, the PG root node associated with a PG group key of the public group, and each of the first local group and the at least one other local group associated with a respective one of the PG leaf nodes and having a second path from the corresponding PG leaf node to the PG root node; and establishing communication between the first member and one or more members of the at least one other local group at least by using the PG group key.

In some embodiments, the method further comprises: establishing communication between the first member and the at least one other member at least by using the LG group key.

In some embodiments, the method further comprises: generating, by the first member, a first key package associated with the first member; obtaining, by the first member, at least one second key package associated with the at least one other member; creating, by the first member, the first LG tree based on the first and second key packages; generating, by the first member and based on the information associated with the root node of the first LG tree, a third key package associated with the first LG tree; and notifying, by the first member, the at least one other member to join the first local group.

In some embodiments, the method further comprises: retrieving, by the first member, a first key package associated with the first local group; obtaining, by the first member, at least one other key package associated with the at least one other local group; creating, by the first member, the PG tree based on the first and second key packages; and notifying, by the first member, the one or more members of the at least one other local group to join the public group.

In some embodiments, the method further comprises: updating, by the first member, the LG nodes along the first path thereof, generating, by the first member, a key package associated with the first LG tree; updating, by the first member, the PG nodes along the second path of the local group associated with the first member; notifying, by the first member, the at least one other member to update the first local group and the public group; and notifying, by the first member, the one or more members of the at least one other local group to update the public group.

In some embodiments, the method further comprises: updating, by the first member, the PG nodes along the second path of the local group associated with the first member; notifying, by the first member, the at least one other member to update the public group; and notifying, by the first member, the one or more members of the at least one other local group to update the public group.

In some embodiments, the method further comprises: obtaining, by the first member, a first key package associated with a new member; associating, by the first member, the new member with an empty LG leaf node of the first LG tree or a new LG leaf node of the first LG tree based on the first key package; updating, by the first member, the LG nodes along the first path thereof, generating, by the member and after said updating the LG nodes, a second key package associated with the first LG tree; updating, by the first member, the PG nodes along the second path of the local group associated with the first member; notifying, by the first member and after said updating the PG nodes, the new member to join the first local group and the public group; notifying, by the first member and after said updating the PG nodes, the at least one other member to update the first local group and the public group; and notifying, by the first member, the one or more members of the at least one other local group to update the public group.

In some embodiments, the method further comprises: obtaining, by the first member, a key package associated with a second local group; associating, by the first member, the second local group with an empty PG leaf node of the PG tree or a new PG leaf node of the PG tree; updating, by the first member, the PG nodes along the second path of the local group associated with the first member; notifying, by the first member and after said updating the PG nodes, the members of the first local group and the at least one other local group to update the public group; and notifying, by the first member and after said updating the PG nodes, one or more members of the second local group to join the public group.

In some embodiments, the first local group further comprises a second member; and the method further comprises: nullifying, by the first member, the LG nodes along the first path of the second member; updating, by the first member, the LG nodes along the first path thereof, generating, by the first member and after said updating the LG nodes, a key package for associating with the first local group; updating, by the first member and after said updating the LG nodes, the PG nodes along the second path of the local group associated with the first member; notifying, by the first member, the second member to remove itself from the first local group and from the public group; notifying, by the first member and after said updating the PG nodes, the at least one other member to update the first local group and the public group; and notifying, by the first member and after said updating the PG nodes, the one or more members of the at least one other local group to update the public group.

In some embodiments, the public group further comprises a second group; and the method further comprises: nullifying, by the first member, the PG nodes along the second path of the second group; updating, by the first member, the PG nodes along the second path of the local group associated with the first member; notifying, by the first member and after said updating the PG nodes, the at least one other member of the first local group and the one or more members of the at least one other local group to update the public group; and notifying, by the first member and after said updating the PG nodes, one or more members of the second group to remove themselves from the public group.

According to one aspect of this disclosure, there is provided an apparatus for executing instructions to perform actions of end-to-end group messaging, the actions comprising: storing a first local-group (LG) tree in a memory of a first member of a first local group, the first local group comprising the first member and at least one other member, the first LG tree comprising a plurality of LG nodes, the plurality of LG nodes comprising a LG root node connecting to a plurality of LG leaf nodes, the LG root node associated with a LG group key of the local group, and each of the first member and the at least one other member associated with a respective one of the LG leaf nodes and having a first path from the corresponding LG leaf node to the LG root node; storing, in the memory of the first member, a public-group (PG) tree for a public group, the public group comprising the first local group and at least one other local group, the PG tree comprising a plurality of PG nodes, the plurality of PG nodes comprising a PG root node connecting to a plurality of PG leaf nodes, the PG root node associated with a PG group key of the public group, and each of the first local group and the at least one other local group associated with a respective one of the PG leaf nodes and having a second path from the corresponding PG leaf node to the PG root node; and establishing communication between the first member and one or more members of the at least one other local group at least by using the PG group key.

According to one aspect of this disclosure, there is provided a non-transitory computer-readable storage medium comprising computer-executable instructions for end-to-end group messaging, wherein the instructions, when executed, cause a processing structure to perform actions comprising: storing a first local-group (LG) tree in a memory of a first member of a first local group, the first local group comprising the first member and at least one other member, the first LG tree comprising a plurality of LG nodes, the plurality of LG nodes comprising a LG root node connecting to a plurality of LG leaf nodes, the LG root node associated with a LG group key of the local group, and each of the first member and the at least one other member associated with a respective one of the LG leaf nodes and having a first path from the corresponding LG leaf node to the LG root node; storing, in the memory of the first member, a public-group (PG) tree for a public group, the public group comprising the first local group and at least one other local group, the PG tree comprising a plurality of PG nodes, the plurality of PG nodes comprising a PG root node connecting to a plurality of PG leaf nodes, the PG root node associated with a PG group key of the public group, and each of the first local group and the at least one other local group associated with a respective one of the PG leaf nodes and having a second path from the corresponding PG leaf node to the PG root node; and establishing communication between the first member and one or more members of the at least one other local group at least by using the PG group key.

By using the two-tier architecture disclosed herein, the methods, apparatuses, and computer-readable media provide improved end-to-end group messaging methods. For example, by using the two-tier architecture disclosed herein, a LG tree for each local group may be easily and separately created. The creation and updating of a PG tree may be based on the already created LG trees thereby reducing the creation time thereof. Moreover, a LG tree may easily join a plurality of PG trees. Each member only needs to separately store its associated LG tree and the PG tree, and does not need to store the LG trees of other local groups, thereby significantly reducing the storage requirements. Moreover, no empty nodes are needed in the LG trees to allow the private communication therewithin. Since each local group has a separate LG tree, a local group may easily add or remove members thereto or therefrom.

This summary does not necessarily describe the entire scope of all aspects. Other aspects, features, and advantages will be apparent to those of ordinary skill in the art upon review of the following description of specific embodiments.

BRIEF DESCRIPTION OF THE DRAWINGS

Embodiments of the disclosure will now be described in detail in conjunction with the accompanying drawings of which:

FIG. 9 is a sequence diagram showing a process performed by a member who have joined a local group for creating the PG tree of the two-tier architecture shown in FIG. 6;

FIGS. 10A and 10B show an example of creating the PG tree using the process shown in FIG. 9;

FIG. 20 is a sequence diagram showing a remove-LG process performed by a member of a local group for removing another local group from the public group of the two-tier architecture shown in FIG. 6.

DETAILED DESCRIPTION

Embodiments disclosed herein relate to methods, apparatuses, and computer-readable media for secure end-to-end group messaging among a plurality of computing devices of a computer network system. While various embodiments of the disclosure are described below, the disclosure is not limited to these embodiments, and variations of these embodiments may well fall within the scope of the disclosure which is to be limited only by the appended claims.

A. System Structure

Figure 1:
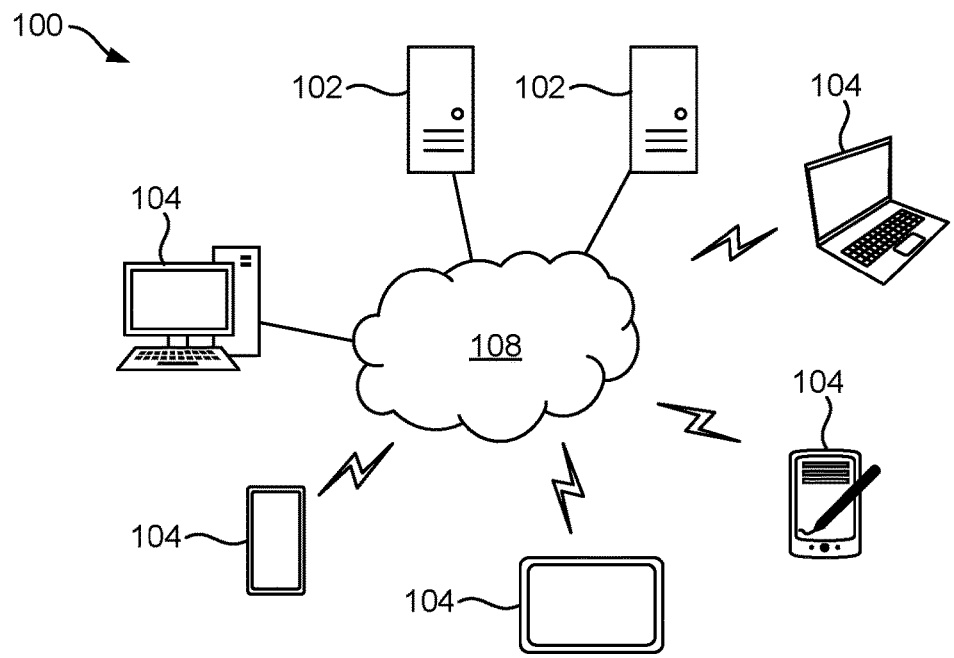
FIG. 1 is a schematic diagram of a computer network system for end-to-end group messaging between a plurality of members, according to some embodiments of the disclosure.

Turning now to FIG. 1, there is shown an embodiment of a computer network system 100 for implementing secure end-to-end group messaging between a plurality of client computing devices, which may be used in online collaborations. As shown, system 100 comprises at least one server computer 102 (also simply denoted "server") and a plurality of client computing devices 104 functionally interconnected by a network 108, such as the Internet, a local area network (LAN), a wide area network (WAN), a metropolitan area network (MAN), and/or the like, via suitable wired and wireless networking connections. As those skilled in the art will appreciate, system 100 in some embodiments may be a local network system within a company, an organization, and/or the like and used by a limited number of users thereof. In some other embodiments, system 100 may leverage the Internet and may be a cloud-computing system. Such a cloud-computing system may comprise interconnected hardware and software resources that are accessible by users, where data and data products may be stored, trained, shared, and queried for usage Server 102 may be a computing device designed specifically for use as a server, and/or a general-purpose computing device acting as a server computer while also being used by various users. Server 102 may execute one or more server programs.

Client computing devices 104 may be portable and/or non-portable computing devices such as laptop computers, tablets, smartphones, Personal Digital Assistants (PDAs), desktop computers, and/or the like. Each client computing device 104 may execute one or more client application programs which sometimes may be called "apps".

Figure 2:
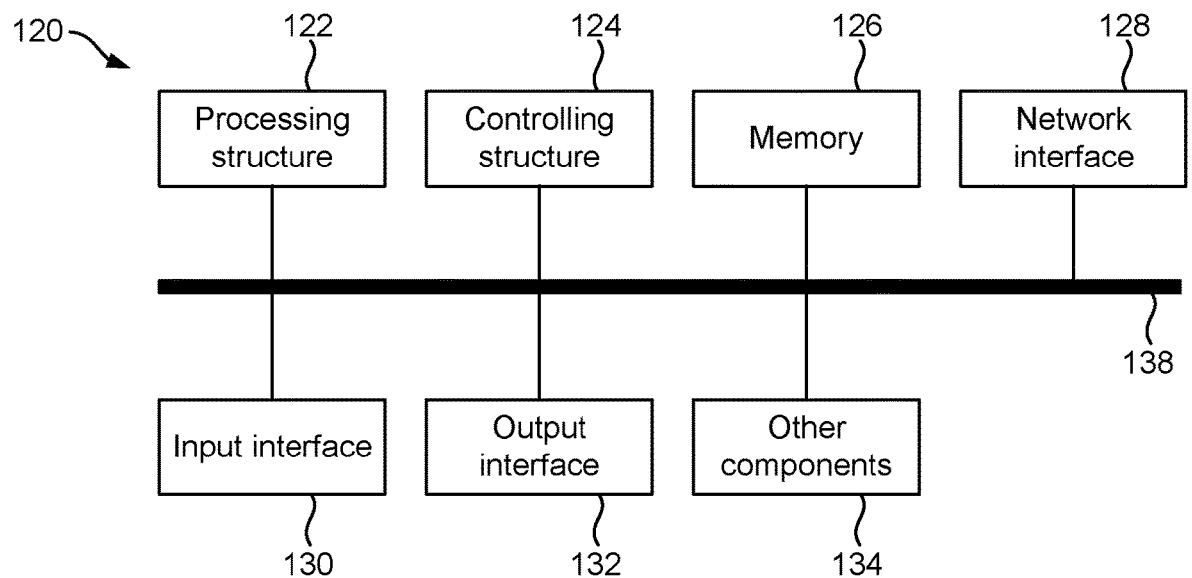
FIG. 2 is a schematic diagram showing a simplified hardware structure of a computing device of the computer network system shown in FIG. 1.

Generally, server 102 and client computing devices 104 comprise similar hardware structures such as the hardware structure 120 shown in FIG. 2. As shown, hardware structure 120 comprises a processing structure 122, a controlling structure 124, one or more non-transitory computer-readable memory or storage devices 126, a network interface 128, an input interface 130, and an output interface 132, functionally interconnected by a system bus 138. Hardware structure 120 may also comprise other components 134 coupled to system bus 138.

Processing structure 122 may be one or more single-core or multiple-core computing processors, generally referred to as central processing units (CPUs), such as INTEL® microprocessors (INTEL is a registered trademark of Intel Corp., Santa Clara, CA, USA), AMD® microprocessors (AMD is a registered trademark of Advanced Micro Devices Inc., Sunnyvale, CA, USA), ARM® microprocessors (ARM is a registered trademark of Arm Ltd., Cambridge, UK) manufactured by a variety of manufactures such as Qualcomm of San Diego, California, USA, under the ARM® architecture, or the like. When processing structure 122 comprises a plurality of processors, the processors thereof may collaborate via a specialized circuit such as a specialized bus or via system bus 138.

Processing structure 122 may also comprise one or more real-time processors, programmable logic controllers (PLCs), microcontroller units (MCUs), µ-controllers (UCs), specialized/customized processors, hardware accelerators, and/or controlling circuits (also denoted "controllers") using, for example, field-programmable gate array (FPGA) or application-specific integrated circuit (ASIC) technologies, and/or the like. In some embodiments, the processing structure includes a CPU (otherwise referred to as a host processor) and a specialized hardware accelerator which includes circuitry configured to perform specific computations such as computations of neural networks (for example, tensor multiplication, matrix multiplication, and the like). The host processor may offload computations to the hardware accelerator to perform computation operations. Examples of a hardware accelerator include a graphics processing unit (GPU), Neural Processing Unit (NPU), and Tensor Process Unit (TPU).

Generally, each processor of processing structure 122 comprises necessary circuitries implemented using technologies such as electrical and/or optical hardware components for executing one or more processes as the implementation purpose and/or the use case maybe, to perform various tasks. For example, each processor of processing structure 122 may comprise logic gates implemented by semiconductors to perform various computations, calculations, operations, and/or processes. Examples of logic gates include AND gates, OR gates, XOR (exclusive OR) gates, and NOT gates, each of which takes one or more inputs and generates or otherwise produces an output therefrom based on the logic implemented therein. For example, a NOT gate receives an input (for example, a high voltage, a state with electrical current, a state with an emitted light, or the like), inverts the input (for example, forming a low voltage, a state with no electrical current, a state with no light, or the like), and outputs the inverted input as the output.

While the inputs and outputs of the logic gates are generally physical signals and the logics or processes thereof are tangible operations with physical results (for example, outputs of physical signals), the inputs and outputs thereof are generally described using numerals (for example, numerals "0" and "1") and the operations thereof are generally described as "computing" (which is how the "computer" or "computing device" is named) or "calculation" or more generally, "processing", for generating or producing the outputs from the inputs thereof.

Sophisticated combinations of logic gates in the form of a circuitry of logic gates, such as the one or more processors of processing structure 122, may be formed using a plurality of AND, OR, XOR, and/or NOT gates. Such combinations of logic gates may be implemented using individual semiconductors, or more often be implemented as integrated circuits (ICs). A circuitry of logic gates may be "hard-wired" circuitry which, once designed, may only perform the designed tasks. In other words, the tasks thereof are "hard-coded" in the circuitry.

With the advance of technologies, it is often the case that a circuitry of logic gates, such as the one or more processors of processing structure 122, may be alternatively designed in a general manner so that it may perform various tasks according to a set of "programmed" instructions implemented as firmware and/or software and stored in one or more non-transitory computer-readable storage devices or media. Thus, the circuitry of logic gates, such as the one or more processors of processing structure 122, is usually of no use without meaningful firmware and/or software.

Of course, those skilled the art will appreciate that a processor may be implemented using other technologies such as analog technologies.

Controlling structure 124 comprises one or more controlling circuits, such as graphic controllers, input/output chipsets, and the like, for coordinating operations of various hardware components and modules of server 102 and/or computing devices 104.

Memory 126 comprises one or more storage devices or media accessible by processing structure 122 and controlling structure 124 for reading and/or storing instructions for processing structure 122 to execute, and for reading and/or storing data, including input data and data generated by processing structure 122 and controlling structure 124. Memory 126 may be volatile and/or non-volatile, non-removable or removable memory such as RAM, ROM, EEPROM, solid-state memory, hard disks, CD, DVD, flash memory, or the like. In use, memory 126 is generally divided into a plurality of portions for different use purposes. For example, a portion of memory 126 (denoted as storage memory herein) may be used for long-term data storing, for example, for storing files or databases. Another portion of memory 126 may be used as the system memory for storing data during processing (denoted as working memory herein).

Network interface 128 comprises one or more network modules for connecting to other computing devices or networks through network 108 by using suitable wired or wireless communication technologies such as Ethernet, WI-FI® (WI-FI is a registered trademark of Wi-Fi Alliance, Austin, TX, USA), BLUETOOTH® (BLUETOOTH is a registered trademark of Bluetooth Sig Inc., Kirkland, WA, USA), Bluetooth Low Energy (BLE), Z-Wave, Long Range (LoRa), ZIGBEE® (ZIGBEE is a registered trademark of ZigBee Alliance Corp., San Ramon, CA, USA), wireless broadband communication technologies such as Global System for Mobile Communications (GSM), Code Division Multiple Access (CDMA), Universal Mobile Telecommunications System (UMTS), Worldwide Interoperability for Microwave Access (WiMAX), CDMA2000, Long Term Evolution (LTE), 3GPP, 5G New Radio (5G NR) and/or other 5G networks, and/or the like. In some embodiments, parallel ports, serial ports, USB connections, optical connections, or the like may also be used for connecting other computing devices or networks although they are usually considered as input/output interfaces for connecting input/output devices.

Input interface 130 comprises one or more input modules for one or more users to input data via, for example, touch-sensitive screen, touch-sensitive whiteboard, touch-pad, keyboards, computer mouse, trackball, microphone, scanners, cameras, and/or the like. Input interface 130 may be a physically integrated part of server 102 and/or computing devices 104 (for example, the touch-pad of a laptop computer or the touch-sensitive screen of a tablet), or may be a device physically separated from, but functionally coupled to, other components of server 102 and/or computing devices 104 (for example, a computer mouse). Input interface 130, in some implementation, may be integrated with a display output to form a touch-sensitive screen or touch-sensitive whiteboard.

Output interface 132 comprises one or more output modules for output data to a user. Examples of the output modules include displays (such as monitors, LCD displays, LED displays, projectors, and the like), speakers, printers, virtual reality (VR) headsets, augmented reality (AR) goggles, and/or the like. Output interface 132 may be a physically integrated part of the server 102 and/or computing devices 104 (for example, the display of a laptop computer or a tablet), or may be a device physically separate from but functionally coupled to other components of server 102 and/or computing devices 104 (for example, the monitor of a desktop computer).

System bus 138 interconnects various components 122 to 134 enabling them to transmit and receive data and control signals to and from each other.

From the computer point of view, server 102 and/or computing devices 104 may comprise a plurality of modules. Herein, a "module" is a term of explanation referring to a hardware structure such as a circuitry implemented using technologies such as electrical and/or optical technologies (and with more specific examples of semiconductors) for performing defined operations or processes. A "module" may alternatively refer to the combination of a hardware structure and a software structure, wherein the hardware structure may be implemented using technologies such as electrical and/or optical technologies (and with more specific examples of semiconductors) in a general manner for performing defined operations or processes according to the software structure in the form of a set of instructions stored in one or more non-transitory, computer-readable storage devices or media.

As a part of a device, an apparatus, a system, and/or the like, a module may be coupled to or integrated with other parts of the device, apparatus, or system such that the combination thereof forms the device, apparatus, or system. Alternatively, the module may be implemented as a stand-alone device or apparatus.

Figure 3:
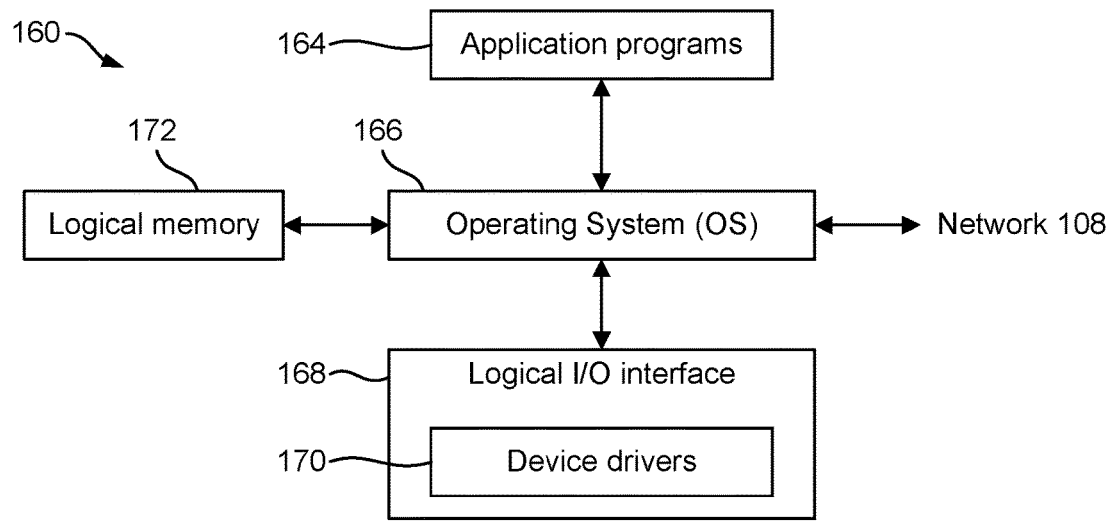
FIG. 3 is a schematic diagram showing a simplified software architecture of a computing device of the system shown in FIG. 1.

FIG. 3 shows a simplified software architecture 160 of server 102 or computing device 104. Software architecture 160 comprises one or more application programs 164, an operating system 166, a logical input/output (I/O) interface 168, and a logical memory 172. Application programs 164, operating system 166, and logical I/O interface 168 are generally implemented as computer-executable instructions or code in the form of software programs or firmware programs stored in logical memory 172 which may be executed by processing structure 122.

Herein, a software or firmware program is a set of computer-executable instructions or code stored in one or more non-transitory computer-readable storage devices or media such as memory 126, and may be read and executed by processing structure 122 and/or other suitable components of server 102 and/or computing devices 104 for performing one or more processes. Those skilled in the art will appreciate that a program may be implemented as either software or firmware, depending on the implementation purposes and requirements. Therefore, for ease of description, the terms "software" and "firmware" may be interchangeably used hereinafter.

Herein, a process has a general meaning equivalent to that of a method, and does not necessarily correspond to the concept of a computing process (which is the instance of a computer program being executed). More specifically, a process herein is a defined method implemented as software or firmware programs executable by hardware components for processing data (such as data received from users, other computing devices, other components of server 102 and/or computing devices 104, and/or the like). A process may comprise or use one or more functions for processing data as designed. Herein, a function is a defined sub-process or sub-method for computing, calculating, or otherwise processing input data in a defined manner and generating or otherwise producing output data.

Alternatively, a process may be implemented as one or more hardware structures having necessary electrical and/or optical components, circuits, logic gates, integrated circuit (IC) chips, and/or the like.

Referring back to FIG. 3, one or more application programs 164 are executed by or run by processing structure 122 for performing various tasks.

Operating system 166 manages various hardware components of server 102 or computing device 104 via logical I/O interface 168, manages logical memory 172, and manages and supports application programs 164. Operating system 166 is also in communication with other computing devices (not shown) via network 108 to allow application programs 164 to communicate with those running on other computing devices. As those skilled in the art will appreciate, operating system 166 may be any suitable operating system such as MICROSOFT® WINDOWS® (MICROSOFT and WINDOWS are registered trademarks of the Microsoft Corp., Redmond, WA, USA), APPLE® OS X, APPLE® iOS (APPLE is a registered trademark of Apple Inc., Cupertino, CA, USA), Linux, ANDROID® (ANDROID is a registered trademark of Google LLC, Mountain View, CA, USA), or the like. Server 102 and computing devices 104 of the system 100 may all have the same operating system, or may have different operating systems.

Logical I/O interface 168 comprises one or more device drivers 170 for communicating with respective input and output interfaces 130 and 132 for receiving data therefrom and sending data thereto. Received data may be sent to application programs 164 for being processed by application programs 164. Data generated by application programs 164 may be sent to logical I/O interface 168 for outputting to various output devices (via output interface 132).

Logical memory 172 is a logical mapping of physical memory 126 for facilitating application programs 164 to access. In this embodiment, logical memory 172 comprises a storage memory area that may be mapped to a non-volatile physical memory such as hard disks, solid-state disks, flash drives, and the like, generally for long-term data storage therein. Logical memory 172 also comprises a working memory area that is generally mapped to high-speed, and in some implementations, volatile physical memory such as RAM, generally for application programs 164 to temporarily store data during program execution. For example, an application program 164 may load data from the storage memory area into the working memory area, and may store data generated during its execution into the working memory area. Application program 164 may also store some data into the storage memory area as required or in response to a user's command.

In server computer 102, application programs 164 generally provide server functions for managing network communication with client computing devices 104 and facilitating collaboration between the server computer 102 and client computing devices 104. Herein, the term "server" may refer to a server computer 102 from a hardware point of view or a logical server from a software point of view, depending on the context.

As described above, processing structure 122 is usually of no use without meaningful firmware and/or software. Similarly, while a computer system such as system 100 may have the potential to perform various tasks, it cannot perform any tasks and is of no use without meaningful firmware and/or software. As will be described in more detail later, system 100 described herein, as a combination of hardware and software, generally produces tangible results tied to the physical world, wherein the tangible results such as those described herein may lead to improvements to the computer and system themselves.

B. Dynamic Grouping for Secure End-to-End Group Messaging Using Messaging Layer Security Protocol As described above, the computer network system 100 may be used for implementing secure end-to-end group messaging among the client computing devices 104, which may be used in online collaborations. In this context, "online" may refer to a state in which server 102 and client computing devices 104 are communicatively coupled to one another via network 108 such that data may be communicated between client computing devices 104, via network 108.

In these embodiments, the at least one server computer 102 runs one or more application programs or program modules for managing secure end-to-end group messaging (such as an online collaboration with secure end-to-end messaging) among the client computing devices 104 as a group and the client computing devices 104 coordinate with each other for secure end-to-end group messaging. Each client computing device 104 is used by a user and is denoted a "member" of the group hereinafter. Those skilled in the art will appreciate that some actions performed by a member such as joining the end-to-end group messaging may be performed by the member under its user's instruction while some other actions performed by a member, such as updating the group tree (described in more detailed later) may be automatically performed by the client computing device as the member.

Secure end-to-end group messaging generally require secure network communications between the client computing devices 104 using suitable technologies such as end-to-end encryption (E2EE).

The Messaging Layer Security (MLS) protocol has been developed to implement E2EE (see, for example, https://messaginglayersecurity.rocks/mls-protocol/draft-ietf-mls-protocol.html, the content of which is incorporated herein by reference in its entirety). MLS uses, for example, TreeKEM (Karthikeyan Bhargavan, Richard Barnes, and Eric Rescorla, *TreeKEM: Asynchronous Decentralized Key Management for Large Dynamic Groups. A protocol proposal for Messaging Layer Security (MLS)*; https://hal.inria.fr/hal-02425247).

Figure 4:
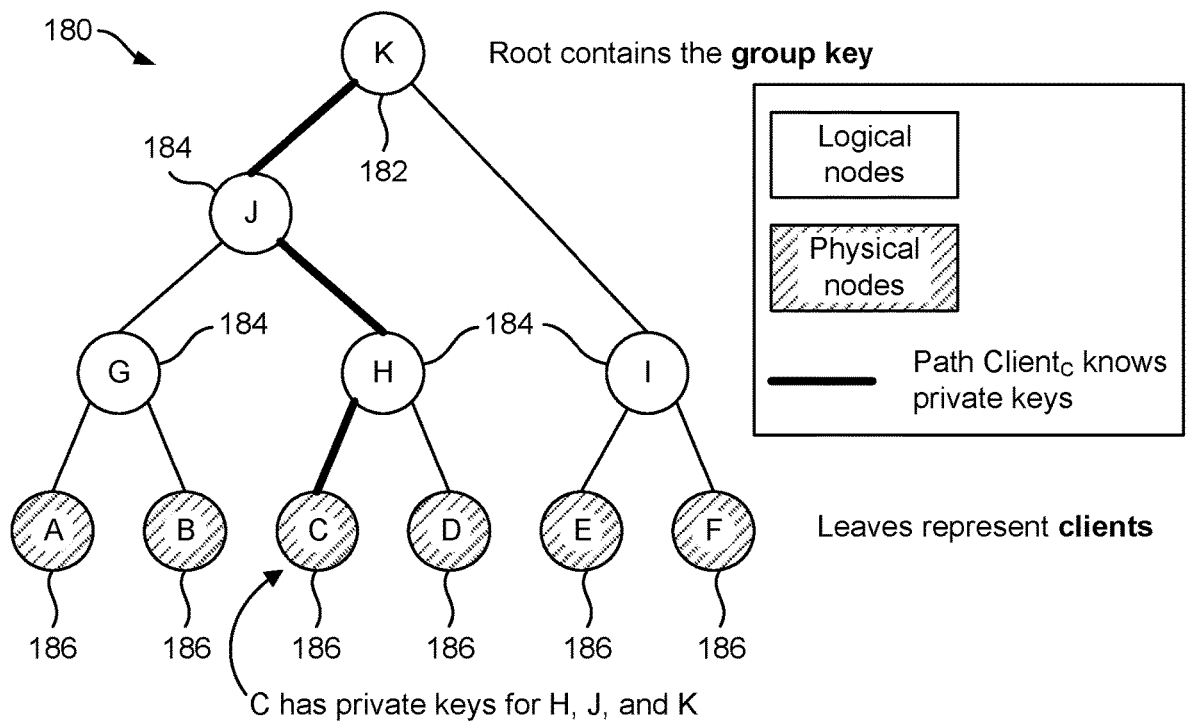
FIG. 4 shows a group tree comprising physical leaf nodes interconnected by logical nodes, according to some embodiments of the disclosure.

FIG. 4 shows an example of a group tree structure 180 (or simply the "group tree") for secure end-to-end group messaging using MLS. The group tree structure 180 comprises a root node 182 (that is, node K) connecting a plurality of leaf nodes 186 (that is, A, B, C, D, E, and F) via a plurality of intermediate nodes 184 arranged in different levels. In this example, the group tree 180 is a left balanced binary tree (LBBT) wherein each parent node (that is, a node on a higher level) may connect to maximum two child nodes (that is, two nodes on the immediate lower level), and the leaf nodes have no child nodes.

Each leaf node 186 (for example, node A, B, C, D, E, or F in FIG. 4) represents a group member (that is, representing a client computing device) and may also be denoted "physical node" hereinafter. The root node 182 and the intermediate nodes 184 (for example, the non-leaf nodes K, G, H, I, and J) are logical nodes.

Each node of the group tree structure 180 comprises a secret key which may be used for deriving a public and private key pairs. As those skilled in the art will appreciate, the public key may be known by a plurality of members and may be used for encryption data for securely transmitting to the owner of the public key. On the other hand, the private key is only known to the owner thereof and may be used to decrypt the data encrypted using the corresponding public key.

In these embodiments, the secret key of each leaf node 186 is generated randomly by the member associated therewith and the secret key of each logical node 182 or 184 is generated from the secret key of one of its child node. The group tree structure 180 also comprises a group key derived from the secret key of the root node 182.

As explained in further detail below, each member is able to derive the secret keys of the logical nodes 182 and 184 along a direct path extending from its leaf node 186 to the root node 182. For example, client C is able to derive the secret key of node H from a randomly generated secret key of node C, which in turn allows the derivation of the secret key of node J, which in turn allows the derivation of the secret key of the root node K, and which in turn allows the derivation of the group key. For each node along the direct path, a public and private key pair is derivable from its generated or derived secret key.

The group tree 180 is used to efficiently propagate updates to the secret keys (and hence, updates to the public and private key pairs) as the group tree 180 is expanded to accommodate the addition of new members. For example, the secret keys (and hence, the public and private key pairs) may be updated periodically and/or in response to any change in the group membership, such as after a member of the group is added to or removed from the group. As a result, MLS is able to achieve forward secrecy and post-compromise security.

Therefore, two leaf nodes 186 having a common logical node 184 along their paths to the root node 182 (in other words, "under" the common logical node 184) may securely and privately communicate with each other based on the secret key (and hence, the public and private key pair derived therefrom) of the common logical node 184, and the communication therebetween is undecryptable (that is, cannot be decrypted) to other members whose paths to the root node 182 do not trespass that common logical node 184.

For example, leaf nodes A and B under the common logical node G may securely and privately communicate with each other and their communication is undecryptable to other leaf nodes C, D, E, and F.

As another example, leaf nodes A, B, C, and D under the common logical node J may securely and privately communicate with each other. Their communication is decryptable by any one of the leaf nodes A, B, C, and D but is undecryptable to other leaf nodes E and F.

As a further example, all leaf nodes A to F under the root node 182 may securely and privately communicate with each other. Their communication is decryptable by all leaf nodes A to F.

The use of such a group tree 180 allows for updates to the secret keys (which will be used to generate a new group key) to be efficiently propagated, and hence is suitable for large groups of tens of thousands of group members. Moreover, the MLS protocol is defined such that it is not required for all group members to be online in order for a consensus to be reached on the group key.

Figure 5:
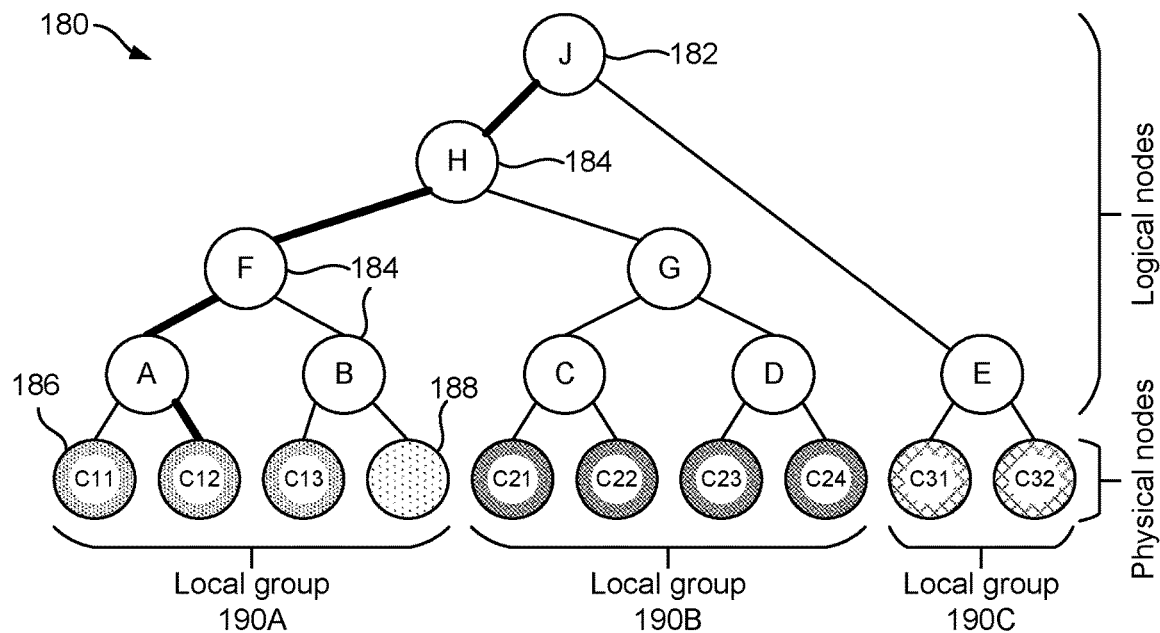
FIG. 5 shows a group tree comprising physical leaf nodes interconnected by logical nodes, wherein the physical leaf nodes are partitioned into a plurality of local groups.

The group tree and MLS protocol may be used for secure end-to-end group messaging among members of a plurality of subgroups. FIG. 5 shows an example of a group tree 180 of an organization (such as a company) having a plurality of members represented by the leaf nodes 186. As shown, while the members (also identified using reference numeral 186) may securely communicate with each other as a group (also denoted a "public group" or "PG"), the members are partitioned into a plurality of subgroups 190 (such as departments of the company; also denoted "local groups" or "LG"). For example, members C11, C12, and C13 are in local group 190A, members C21, C22, C23, and C24 are in local group 190B, members C31 and C32 are in local group 190C. Members in the same local group 190 may securely communicate with each other while maintaining privacy from members of other local groups. For example, members of local groups 190A and 190B may communicate securely and privately based on the secret key of the logical node H. However, while members of local group 190A or 190C (or local groups 190B and 190C) may securely communicate with each other, they cannot communicate privately as the common node thereof is the root node.

Those skilled in the art will appreciate that directly creating and maintaining the group tree 180 shown in FIG. 5 for a large number of members 186 (such as tens of thousands of members) may have several disadvantages such as:

- As all members 186 are in the same group tree 180, every member 186 needs store the entire group tree 180 which significantly increases the storage requirements. Moreover, as shown in FIG. 5, the group tree 180 may have to include empty nodes, for example the empty node 188 in local group 190A, to allow the private communication in local group 190A to use the key associated with node F which is only known to C11, C12, and C13.
- It may be difficult to dynamically create and maintain local groups. The creator of the group tree (which is a member of a local group) may need to know the maximum size of each local group 190 (that is, the maximum number of members 186 in each local group 190) before creating the group tree. When the maximum size of a local group 190 needs to be changed, the entire group tree 180 may need to be recreated. Moreover, when TreeKEM is used, new members have to be added to the rightmost of the group tree 180. Therefore, new members cannot be directly added to local group 190B, for example.

Figure 6:
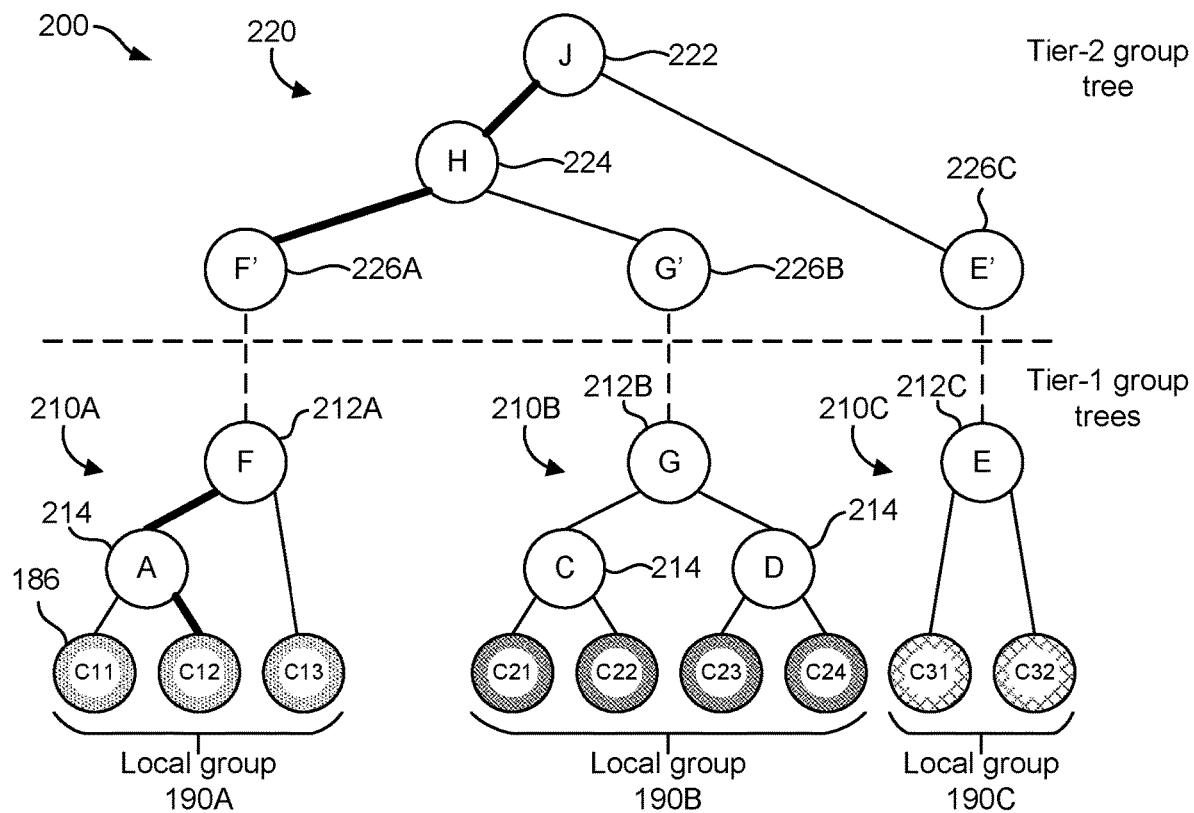
FIG. 6 shows a two-tier architecture for implementing the functions of the group tree shown in FIG. 5, wherein the two-tier architecture comprises a public-group (PG) tree and a plurality of local-group (LG) trees, wherein each LG tree corresponds to a local group and each leaf node of the PG tree is associated with the root node of a LG tree.

As shown in FIG. 6, in these embodiments, a two-tier architecture 200 having a plurality of Tier-1 group trees 210 and at least one Tier-2 group tree 220 is used for secure end-to-end group messaging in an organization. Each of the Tier-1 and Tier-2 group trees 210 and 220 is a LBBT wherein each parent node may connect to maximum two child nodes, and the leaf nodes have no child nodes.

Each Tier-1 group tree 210 (denoted a "LG tree" hereinafter) is used for organizing a local group 190 and the terms "local group 190" and "LG tree 210" may be used interchangeably. For example, as shown in FIG. 6, the Tier-1 LG tree 210A is used for organizing the local group 190A, the Tier-1 LG tree 210B is used for organizing the local group 190B, and the Tier-1 LG tree 210C is used for organizing the local group 190C. Each Tier-1 LG tree 210 comprises a root node 212 connecting to a plurality of leaf nodes 186 directly or via one or more intermediate nodes 214.

The Tier-2 group tree 220 (denoted the "PG tree" hereinafter) represents the public group (also identified using reference numeral 220) and comprises a root node 222 (corresponding to the root node 182 shown in FIG. 5) connecting to a plurality of Tier-2 leaf nodes 226 directly or via one or more intermediate nodes 224. Each Tier-2 leaf node 226 represents or otherwise is associated with a local group 190 and corresponds to the root node 212 thereof such that the entire local group 190 or the LG tree 210 thereof is a "virtual" member of the PG group tree 220. For example, The Tier-2 leaf node 226A corresponds to the root node 212A of the Tier-1 LG tree 210A for local group 190A, the Tier-2 leaf node 226B corresponds to the root node 212B of the Tier-1 LG tree 210B for local group 190B, and the Tier-2 leaf node 226C corresponds to the root node 212C of the Tier-1 LG tree 210C for local group 190C.

Similar to the group tree 180 shown in FIG. 5, the Tier-1 leaf nodes 186 are physical nodes and all other nodes in Tier-1 and Tier-2 group trees 210 and 220 are logical nodes.

Thus, each PG tree 220 is associated with one or more LG trees. A LG tree 210 may be associated with one or more PG trees 220. In some embodiments, there may exist one or more LG trees 210 not associated with any PG tree 220. As will be described below, when needed, such a LG tree 210 may "join" a PG tree 220 and be associated with a leaf node thereof. On the other hand, a LG tree 210 associated with a PG tree 220 may be removed from or otherwise unassociated with the PG tree 220 and become a LG tree unassociated with any PG tree 220.

Compared to the single group tree 180, the two-tier group architecture 200 solves the limitations of the TreeKEM as follows:

- The LG tree 210 for each local group 190 may be easily and separately created.
- The creation and updating of a PG tree 220 may be based on the already created LG trees 210 thereby reducing the creation time thereof. Moreover, a LG tree 210 may easily join a plurality of PG trees 220.
- Each member 186 only needs to separately store the corresponding LG tree 210 that it is associated therewith and the PG tree 220 (that is, they are stored as two trees in the memory of the member), and does not need to store the LG trees of other local groups, thereby significantly reducing the storage requirements. Moreover, no empty nodes are needed in the LG trees to allow the private communication therewithin.
- Since each local group 190 has a separate LG tree 210, a local group 190 may easily add or remove members thereto or therefrom.

Table 1 below shows the performance comparison of group messaging using the single group tree structure for example, as shown in FIG. 5, and group messaging using the two-tier structure for example, as shown in FIG. 6, for m local groups where each local group contains n members. Clearly, the group messaging using the two-tier structure provides lowered computational cost with improved flexibility (such as the reusability).

TABLE 1

Performance Comparison

| Parameter | Single group tree structure (for example, as shown in FIG. 5) | Two-tier structure (for example, as shown in FIG. 6) |
|---|---|---|
| Dynamic Group | No | Yes |
| Group creation cost | O(mn) fetch/encryption/communication | Local: o(n) fetch/encryption/communication per organization<br>Public: O(m) fetch/encryption/communication |
| Local group structure reusability | Cannot be reused in any other public group - repeat fetch/operations | Allow reuse of local groups in many public groups |
| Number of public keys to store per member | O(mn) - may be tweaked to O(n) + O(m) after m organization updates | O(n) + O(m) |
| Operations' time and communication complexities | O(log(mn)) | O(log(m) + log(n)) = O(log(mn)) |

The details of various operations using the two-tier group architecture 200 are now described. In the processes described below, the following data structures and concepts are used:

Path: a path of a member in a LG tree or a local group refers to the path from the leaf node of the LG tree associated with the member to the root node of the LG tree. A path of a member in a PG tree or a public group refers to the path from the leaf node of the PG tree associated with the member's local group to the root node of the PG tree.

Common node: The common node of two members of a local group is the node common to the paths from the members' leaf nodes of the local group to the root node thereof. The common node of two members of a public group is the node common to the paths from the leaf nodes of the public group associated with the member's local group to the root node thereof.

Secret key: Each node comprises a secret key which may be used to derive a private key/public key pair of the node.

Group key: Each local group or public group has a group key derived from the secret key of the root node thereof.

Key package (KP): A KP of a member (or a leaf node of a local group) is a data structure associated with the leaf node thereof and containing the identity (id) of the member, the signature of this KP (generated by the member's signature private key (which is randomly generated and corresponds to the signature public key thereof) to ensure the validity of the KP), a signature public key of the member (for verifying the signature of this KP, and an initial public key (for adding a member to the group). A member may share its KP with other members.

LGKP: A LGKP is the KP of a local group created by a member thereof and is associated with the root node of the local group and the corresponding leaf node of the public group. A LGKP comprises the id of the local group, a signature of the local group (generated by the signature private key of the root node of the local group (which is derived from the root node's secret key and corresponds to the signature public key thereof), a signature public key thereof, and an initial public key thereof.

OprInfo: An OprInfo is a data structure having information of one or more group operations (update, add, or remove) that is sent by a member (that is, a "sender") to other members of the same local or public group (depending on whether the OprInfo is a LGOprInfo or a PGOprInfo; see below) to allow them to apply the associated group operation(s) and update their copies of the LG tree(s) and PG tree(s) of which they are members. An OprInfo comprises all secret keys of a LG or PG tree along the sender's path.

Each secret key of a node along the path in the OprInfo is encrypted using the public key of the other child of this node (if the node is not an empty or null node) or (if the node is an empty node) using the public keys of the two child nodes of the other child (if any child of the other child is null, this process continue until reaches to a logical node that is not null to use its public key for encryption or a leaf node that is not null to use the public key in its associated key package for encryption) to allow these members to obtain the relevant secret keys and derive the group key of the LG or PG tree. LGOprInfo refers to the OprInfo of a local group, $PG_i$OprInfo refers to the OprInfo of the i-th public group, and PGOprInfo refers to the OprInfo of the current public group.

State: A State is a data structure created by a member, which stores the information of the group including the group tree, the KPs of the leaf nodes of the group tree, the public keys of all nodes of the group tree, and the secret keys on the member's direct path to the root node of the group.

LGState: LGState refers to the State of a local group. LGStates of a local group created by different members may have common information about the local group and member-specific information (such as the secret keys on the member's direct path to the root node, which may be different to different members).

PGState: PGState refers to the State of a public group.

Welcome message: A welcome message may be obtained by a member in various operations such as creating a group tree, adding a member to a local group, adding a local group to the public group, and the like. The member may forward the welcome message to other members in the same group for other members to build the group tree and derive the group key thereof.

welcomeMessage refers to the welcome message of a local group generated by a member (that is, a "sender") thereof. The welcomeMessage comprises the structure of the LG tree of the local group, all public keys associated with the nodes of the LG tree, and the generated secret keys associated with the nodes along the path from the sender's parent node (that is, the parent node of the sender's leaf node) to the root node of the local group. Each secret key in the welcomeMessage is encrypted using the public key(s) of one or more members (that is, the public key(s) of their leaf node(s)) where the node associated with the secret key is a common node of the sender and each of these members to allow these members to obtain relevant secret keys using their private keys.

welcomeMessagePG$_i$: welcomeMessagePG$_i$ refers to the welcome message of the i-th public group generated by a member of a local group associated with the i-th public group. The welcomeMessage comprises the structure of the PG tree of the public group, all public keys associated with the nodes of the PG tree, and the generated secret keys associated with the nodes along the path from the leaf node of the i-th public group that is associated with to the member's local group to the root node of the i-th public group. The secret keys in the welcomeMessage are encrypted using relevant public keys such that other members may obtain relevant secret keys using corresponding private keys (similar to the encryption of secret keys in the welcomeMessage).

welcomeMessagePG: welcomeMessagePG refers to the welcome message of the current public group.

In these embodiments, members 186 may use the two-tier group architecture 200 for secure group messaging between various groups using E2EE. More specifically, E2EE group messaging may be established among members 186 of each local group 190 based on the secret key of the root node 212 of their LG tree 210 (for example, by using the group key derived therefrom). Similarly, E2EE group messaging may be established among members 186 of all local groups 190 based on the secret key of the root node 222 of their PG tree 220 (for example, by using the group key derived therefrom).

As the local and public groups 190 and 220 may be easily and separately created, linked, and removed, and as each member may have significantly reduced storage requirement for storing information of necessary groups for group messaging, members 186 may easily and flexibly create a plurality of the two-tier group-tree structures for different group messaging needs. In other words, a member may be associated with a plurality of local groups, and a local group may be linked to or associated with a plurality of public groups.

In some embodiments, any member of a local group 190 may create the LG tree 210 for the local group 190 to establish the end-to-end group messaging.

Figure 7:
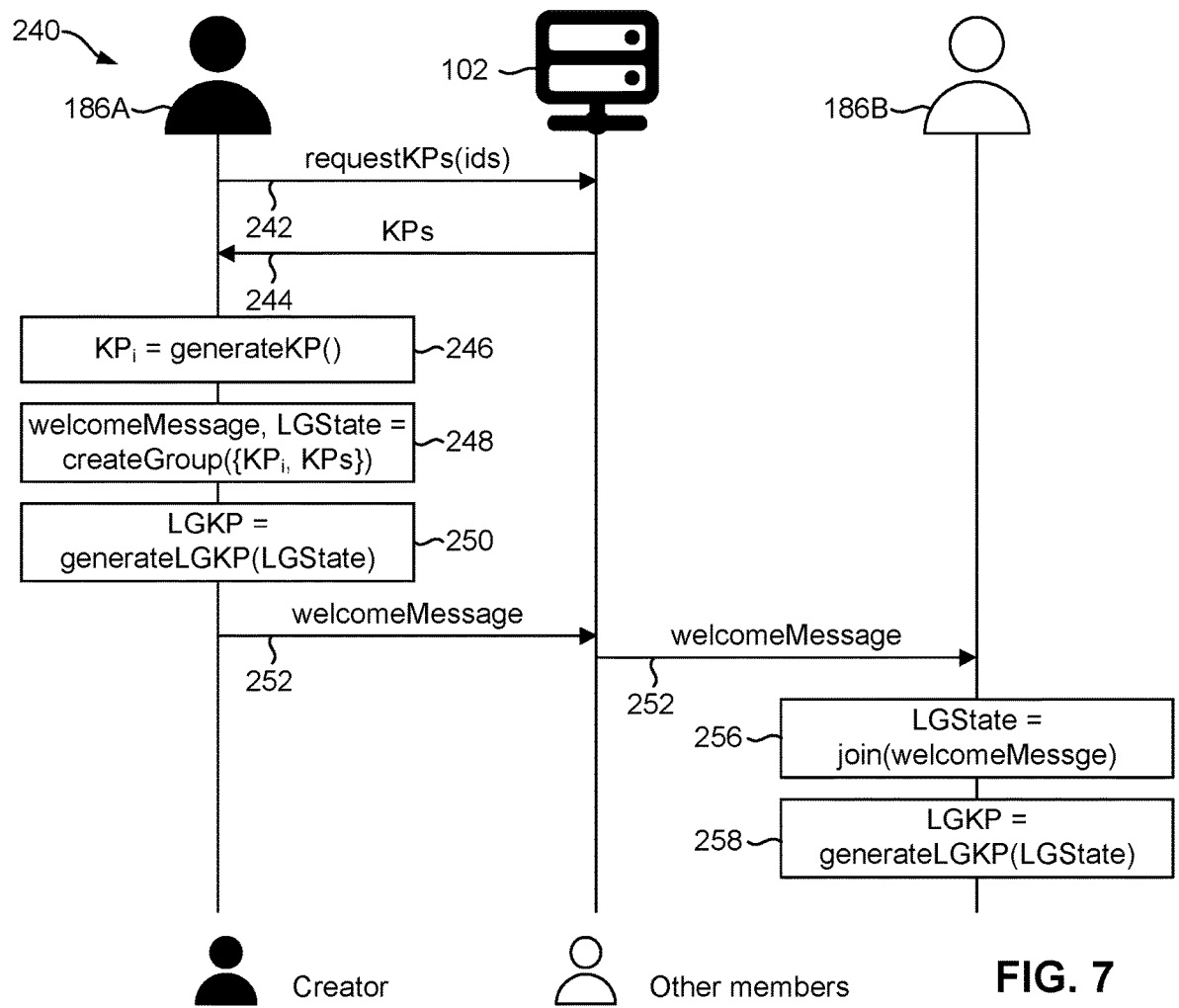
FIG. 7 is a sequence diagram showing a process performed by a member of a local group for creating a LG tree of the two-tier architecture shown in FIG. 6.

FIG. 7 is a sequence diagram showing a process 240 performed by the i-th member 186A of a local group 190 (denoted the "LG creator" of the local group 190) for creating a LG tree 210 therefor. The local group 190 may comprise one or more other members. However, FIG. 7 only shows one other member 186B for ease of description.

As shown, the LG creator 186A sends a request 242, requestKPs, to the server 102 requesting for one or more Key Packages (KPs) for other members 186B of the local group 190 by including the identifiers (ids) of other members 186B in the request. In response, sever 102 send the requested KPs 244 to the LG creator 186A.

The LG creator 186A also generates its own KP (denoted KP$_i$) using for example, a generateKP function 246.

By using its own KP$_i$ and the one or more KPs received from the server 102, the LG creator 186A may create the LG tree 210 for the local group 190 even if other group members 186B are offline.

For example, the LG creator 186A uses its own KP$_i$ and the KPs received from the server 102 to create the LG tree 210 (and thus establishes the local group 190 in the end-to-end group messaging) by using for example, a createGroup function 248. More specifically, the createGroup function 248 creates the LG tree 210 using KP$_i$ of the LG creator 186A and the KPs that the LG creator 186A received from the server 102, generates the secret key for the LG creator 186A (or the leaf node thereof) and associates it therewith, and derives the secret keys for the logical nodes 212 and 214 of the local group 190 and associates them therewith. The LG creator 186A also obtains from the createGroup function 248 a welcome message (welcomeMessage) and the state of the local group (LGState) having a copy of the LG tree 210, wherein the welcome message is encrypted by each initial public key in the KP of the corresponding other member 186B.

The LG creator 186A also generates the LGKP of the local group 190 by using for example, a generateLGKP function 250 with the LGState. As will be described in more detail later, the LGKP may be used by other members to create the PG tree 220.

The LGKP comprises the id of the LG tree 210, a signature public key, an initial public key, and a signature of the LGKP. The id of the LG tree 210 is derived from the group name of the LG tree 210 and the id of the LG creator 186A. The signature public key (and the corresponding signature private key) and the initial public key (and the corresponding initial private key) are derived from the secret key associated with the root node 212 of the LG tree 210. Since all the members 186A and 186B of the local group 190 know the secret key associated with the root node 212, they can derive these public and private keys.

As shown in FIG. 7, the LG creator 186A transmits the welcomeMessage 252 to the sever 102 and the server 102 forwards the welcome messages 252 to other members 186B.

After receiving the welcome message 252, each member 186B uses for example, a join function 256 with the received welcome message 252 to generate its own copy of the LG tree 210, associate itself with the corresponding leaf node of the LG tree 210, obtain the secret key of the common node, from the information in the welcome message 252, and use it to derive other secret keys along the path from the common node to the root node of the LG tree 210, and derive the group key of the LG tree 210, thereby joining the local group 190 in the end-to-end group messaging. The member 186B then obtains a LGState having the copy of the LG tree 210 of the local group 190. Each member 186B also derives the LGKP of the local group 190 by using for example, a generateLGKP function 258 (similar to the generateLGKP function 250) with the LGState obtained from the join function 256.

Figure 8A:
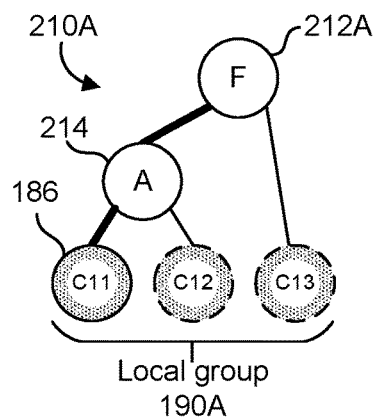
FIGS. 8A and 8B show an example of creating a local group using the process shown in FIG. 7.
Figure 8B:
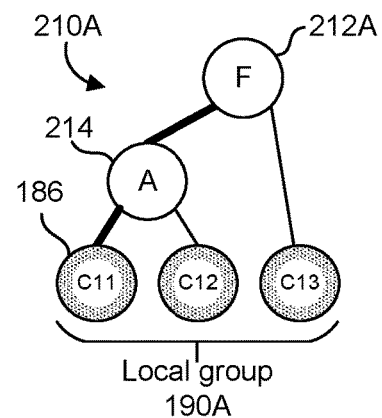

FIGS. 8A and 8B show an example of creating a local group 190A (or the LG tree 210A) by a member C11 thereof. As shown in FIG. 8A, the LG creator C11 creates the LG tree 210A for the local group 190A using the KPs of members C11, C12, and C13, and generates a welcome message and the LGState. The member C11 then constructs the LGKP of the local group 190A and sends the welcome message to C12 and C13 via server 102. In FIG. 8A, members C12 and C13 are shown in broken lines representing that these two members have not yet joined the local group 190A.

More specifically, the creator 186A (that is, C11) randomly generates the secret key s0 for node C11, derives a public/private key pairs for node C11 using s0, and updates the key package of node C11. The creator 186A then uses a HKDF function (a key derivation function (KDF) based on hash-based message authentication code (HMAC)) to derive the secret key s1 for node A from the secret key s0 of node C11, and derives a public/private key pairs for node A using the secret key s1. Similarly, the creator 186A then uses the HKDF function to derive the secret key s2 for node F from the secret key s1 of node A, and derives a public/private key pairs for node F using s2.

The creator 186A then encrypts the secret key s1 of node A using the public key of the key package of the leaf node C12 (where node A is the common node of the creator C11 and the leaf node C12), and encrypts the secret key s2 of node F using the public key of the key package of leaf node C13 (where node F is the common node of the creator C11 and the leaf node C13).

The creator 186A creates a welcome message containing the structure of the LG tree 210A with the key packages of leaf nodes C11, C12, and C13, the public keys of node A and F, and the encrypted secret keys s1 and s2. The creator 186A then sends the welcome message to nodes C12 and C13.

After receiving the welcome message, the member of node C12 uses the join function 256 to retrieve a copy of the LG tree 210A from the received welcome message, use the private key of its key package to decrypt the secret key s1, use the secret key s1 to derive the private/public key pairs of node A, use the secret key s1 to derive the secret key s2 of the root node F (for example, by using HKDF(s1)), and use s2 to derive the private/public key pairs of the root node F.

Similarly, the member of node C13 uses the join function 256 to retrieve a copy of the LG tree 210A from the received welcome message, use the private key of its key package to decrypt the secret key s2 of the root node F, and uses the secret key s2 to derive the private/public key pairs of the root node F.

With this process, all members C11, C12, C13 have the secret key s2 of the root node F and may derive the same group key of the local group 190A.

As shown in FIG. 8B, the members C12 and C13 join the local group 190A using the received welcome message and construct the LGKP of the local group 190A from the secret key associated with the root node 212A.

The creation of the public group 220 may be performed by any member 186 who has joined a local group 190 of the end-to-end group messaging. FIG. 9 is a sequence diagram showing a process 280 performed by the member 186A (denoted the "PG creator") who have joined the i-th local group 190 for creating the PG tree 220. FIGS. 10A and 10B show an example of creating the public group 220 by the member C11.

As shown, the PG creator 186A sends a request 282, requestKPs, to the server 102 requesting for the LGKPs of other local groups by including the identifiers (LGids) of other local groups in the request. In response, sever 102 send the requested LGKPs 284 to the PG creator 186A.

The PG creator 186A also retrieves the LGKP of its own local group (denoted LGKP$_i$) using for example, a getLGKP function 286.

Then, the PG creator 186A uses LGKP$_i$ and the LGKPs received from the server 102 to create the PG tree 220 (and thus establishes the public group in the end-to-end group messaging) by using for example, a createPG function 288.

More specifically, the createPG function 288 creates the PG tree 220 using LGKP$_i$ and the LGKPs, generates the secret keys for the logical nodes 226A, 224, 222 of the public group 220 (along the path from node 226A to root node 222), and associates the generated secret keys therewith. The PG creator 186A also obtains from the createGroup function 288 a welcome message 290 and the state of the public group (PGState) having a copy of the PG tree 210.

As shown in FIG. 10A, the member 186A (not shown) creates the public group 220 using the LGKPs of all local groups 190 wherein the leaf nodes 226A, 226B, and 226C (representing the local groups 210A, 210B, and 210C, respectively) have been created by the local groups 210B, and 210C (or the members thereof) corresponding to the leaf nodes 226B and 226C (represented in broken lines) have not joined the public group 220.

Referring back to FIG. 9, the welcome message 290 is sent to the members of the local group 190A, 190B, and 190C via the server 102.

After receiving the welcome message 290, each member of all local groups 190A, 190B, and 190C (except the PG creator 186A) uses a joinPG function 294 with the welcome message to create its own copy of the PG tree 220 and obtain/derive necessary keys including the group key of the PG tree 220 in a manner similar to the join function 256 described above, thereby joining the public group 220, as shown in FIGS. 9 and 10B. The joinPG function 294 returns a PGState having a copy of the PG tree 220.

By using the above-described two-tier tree architecture 200 and processes for creating the LG and PG trees 210 and 220, a group creator (which is a member of the end-to-end group messaging) does not need to create a full group tree (for example, the full group tree shown in FIG. 5) for all members of the end-to-end group messaging. Rather, the group creator only need to create its own local group and create the public group or the PG tree 220 using local groups or LG trees 210 created by other members, thereby reducing the time overhead for creating the PG tree 220.

As the creation of the LG and PG trees 210 and 220 are conducted separately, the created local groups may also be used for creating other PG trees (thus a local group may be a member of multiple public groups), which reduces the time overhead for creating other PG trees.

Moreover, a member only needs to separately store its associated LG tree 210 and the PG tree 220, thereby reducing the storage overhead.

In some embodiments, the LG and PG trees 210 and 220 may be updated as needed for achieving the forward secrecy (FS) and post-compromise security (PCS).

Figure 11:
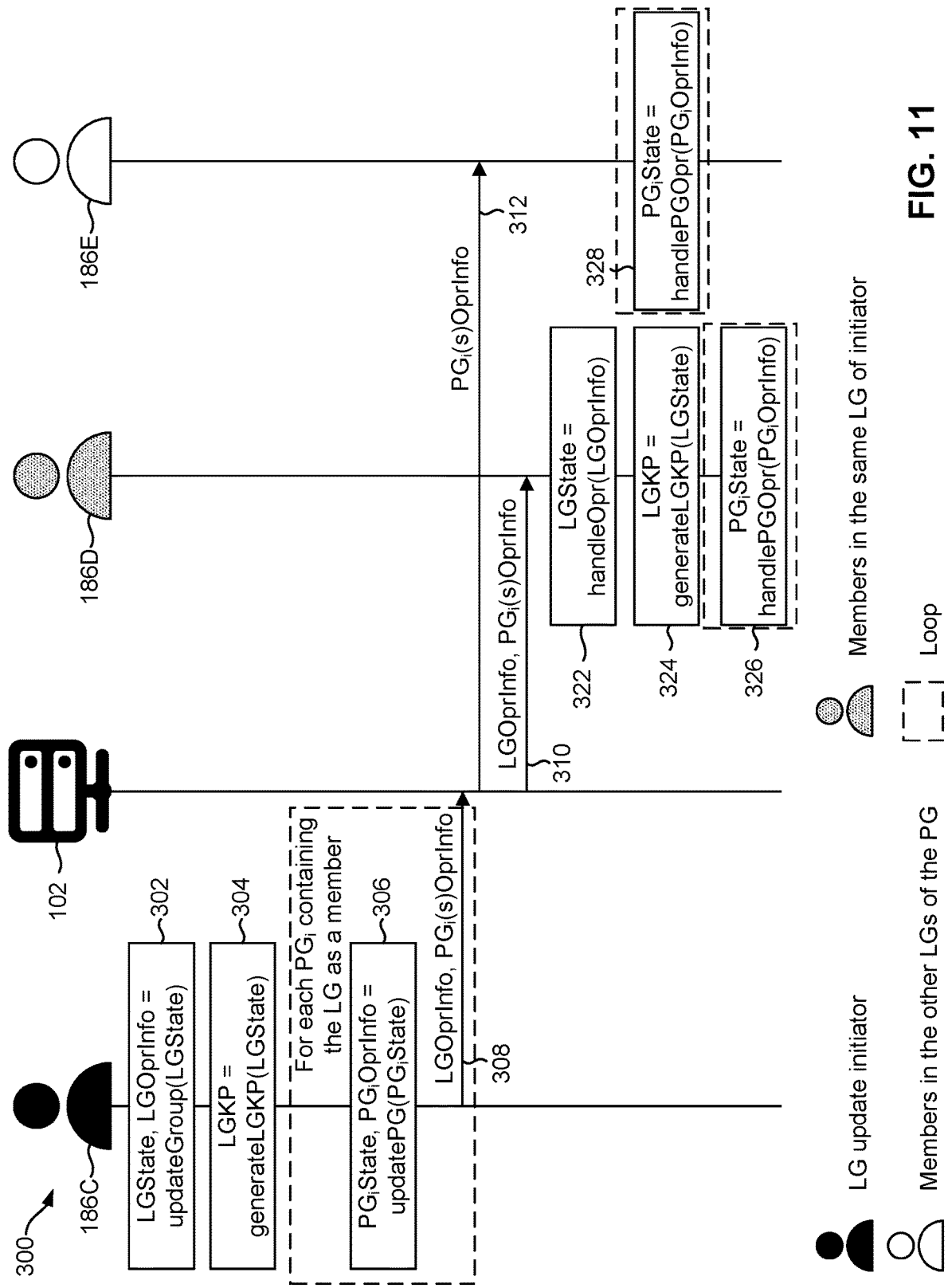
FIG. 11 is a sequence diagram showing an update-group process performed by a member of a local group for updating the two-tier architecture shown in FIG. 6.

FIG. 11 is a sequence diagram showing an update-group process 300 performed by an initiator (which is a member of a local group 190) for updating the LG tree 210. In the following, the process 300 will be described with reference to an example shown in FIGS. 12A and 12B.

Figure 12A:
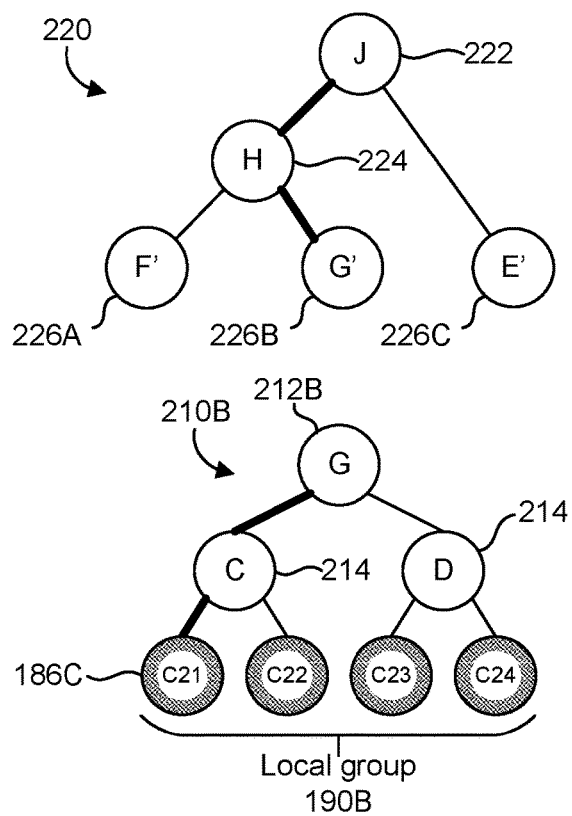
FIGS. 12A and 12B show an example of updating the two-tier architecture shown in FIG. 6 using the update-group process shown in FIG. 11.
Figure 12B:
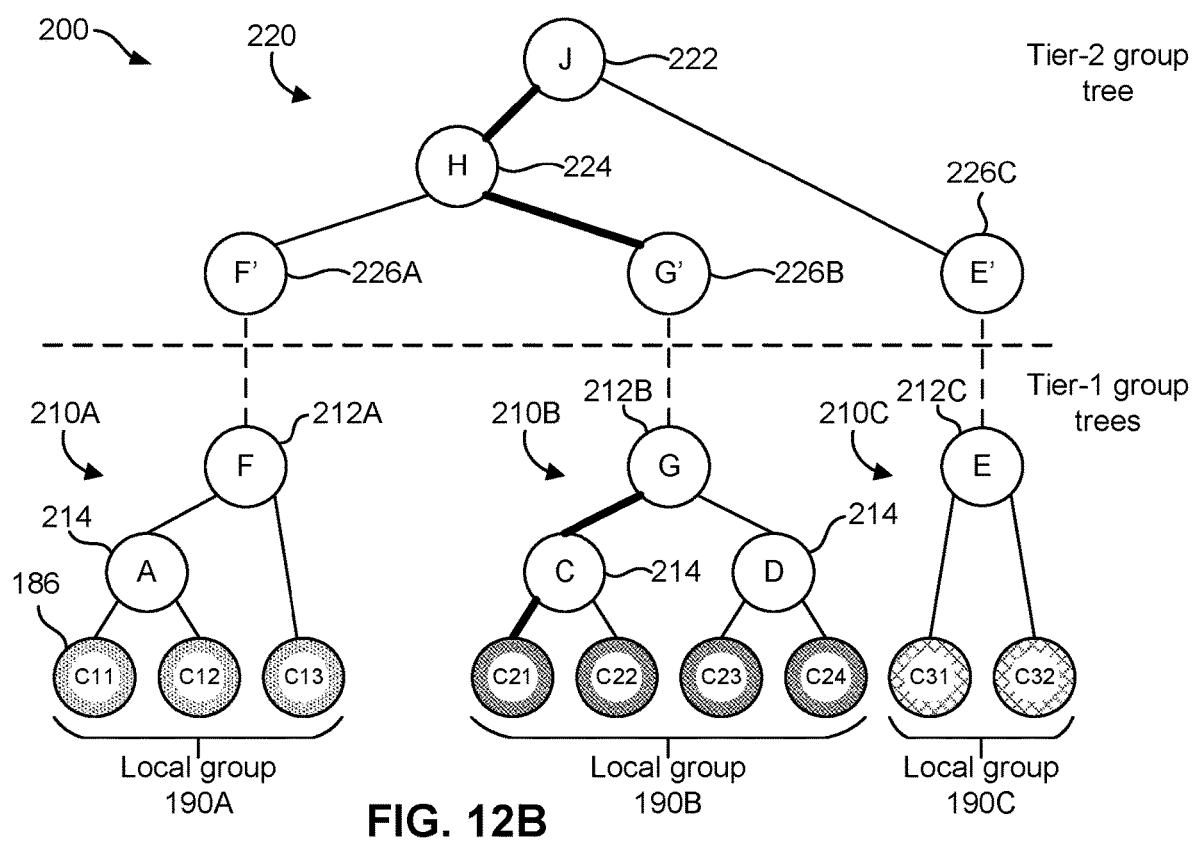

As shown in FIGS. 11, 12A, and 12B, the process 300 is performed when a member 186C (such as member C21) updates the LG tree 210 by updating its path to the root node G (that is, the path C21-C-G) in a local group 190B using for example, an updateGroup function 302 with the LGState. A secret key is randomly generated at the member's leaf node 186C of the local group 190B, and this secret key is propagated through the update path C21-C-G (represented by the thick lines in FIG. 12A) using HKDF to generate other secret keys for the nodes C and G in the update path. The updateGroup function 302 returns the updated LGState (comprising updated LG tree 210) and LGOprInfo.

The member 186C creates a new LGKP for the local group 190 using for example, the generateLGKP function 304 similar to the generateLGKP function 250 or the generateLGKP function 258 described above.

Then, for each public group $PG_i$ that contains this local group 190, the member 186C updates the secret keys of the nodes of the public group $PG_i$ (for example, the public group 220) along the path from the corresponding leaf node to the root node thereof, by updating the path of this local group 190B in the public group 220 (that is, the path G'-H-J from the leaf node 226B to root node 222 through the intermediate node 224; represented by the thick lines in FIG. 12B) by using for example, the updatePG function 306 with $PG_i$State, which returns information 308 including the updated $PG_i$State and $PG_i$OprInfo of the public group $PG_i$. In FIG. 11, the aggregation of the one or more $PG_i$OprInfo is denoted "$PG_i$(s)OprInfo".

The member 186C sends the LGOprInfo of the local group 190B and $PG_i$(s)OprInfo (collectively identified as 310 in FIG. 11) to members 186D (for example, C22, C23, and C24) of the same local group 190B of the initiator 186C via the server 102. The LGOprInfo sent to each member 186D comprises the newly generated secret keys encrypted using suitable public keys. For example, the LGOprInfo comprises the secret key of the node C (which is the common node of the path C21-C-G of the member 186C and the path C22-C-G of the leaf node C22) encrypted using the public key of C22, and the secret key of the node G (which is the common node of the path C21-C-G of the member 186C and the paths C23-C-G and C24-C-G of the leaf nodes C23 and C24) encrypted using the public keys of C23 and C24 (because node D currently is an empty node). The $PG_i$OprInfo sent to each member 186D comprises the secret key of the leaf node 226B.

Each member 186D applies the updates to its copy of the LG tree 210B (which is initiated by the member 186C) by using the handleOpr function 322, and derives the LGKP and its private keys using the generateLGKP function 324. The members 186D then use the private key corresponding to the public key in the LGKP to apply update to its copy of the PG tree 220 by using the handlePGOpr function 326 with the $PG_i$OprInfo. In embodiments where there are multiple public groups, the handlePGOpr function 326 may be repeatedly used with each $PG_i$OprInfo to apply update to its copy of all PG trees 220 that the local group of the member 186D is associated therewith.

The member 186C also sends $PG_i$(s)OprInfo (identified as 312 in FIG. 11) to members 186E (for example, C11, C12, C13, C31, and C32) of other local groups 190A and 190C of the public group 220.

Each member 186E in other local groups of the public group $PG_i$ then apply update to its copy of the PG tree of the public group $PG_i$ by using the handlePGOpr function 328. In embodiments where there are multiple public groups, the handlePGOpr function 328 may be repeatedly used to apply update to all public groups that the member 186E is associated therewith.

The update-group process 300 achieves the FS and PCS and may update the group key efficiently, which allows frequent updates of the group key. The updated group key cannot be derived from the old group keys thereby ensuring the security of communications in the end-to-end group messaging (for example, even when an old group key is compromised).

Figure 13:
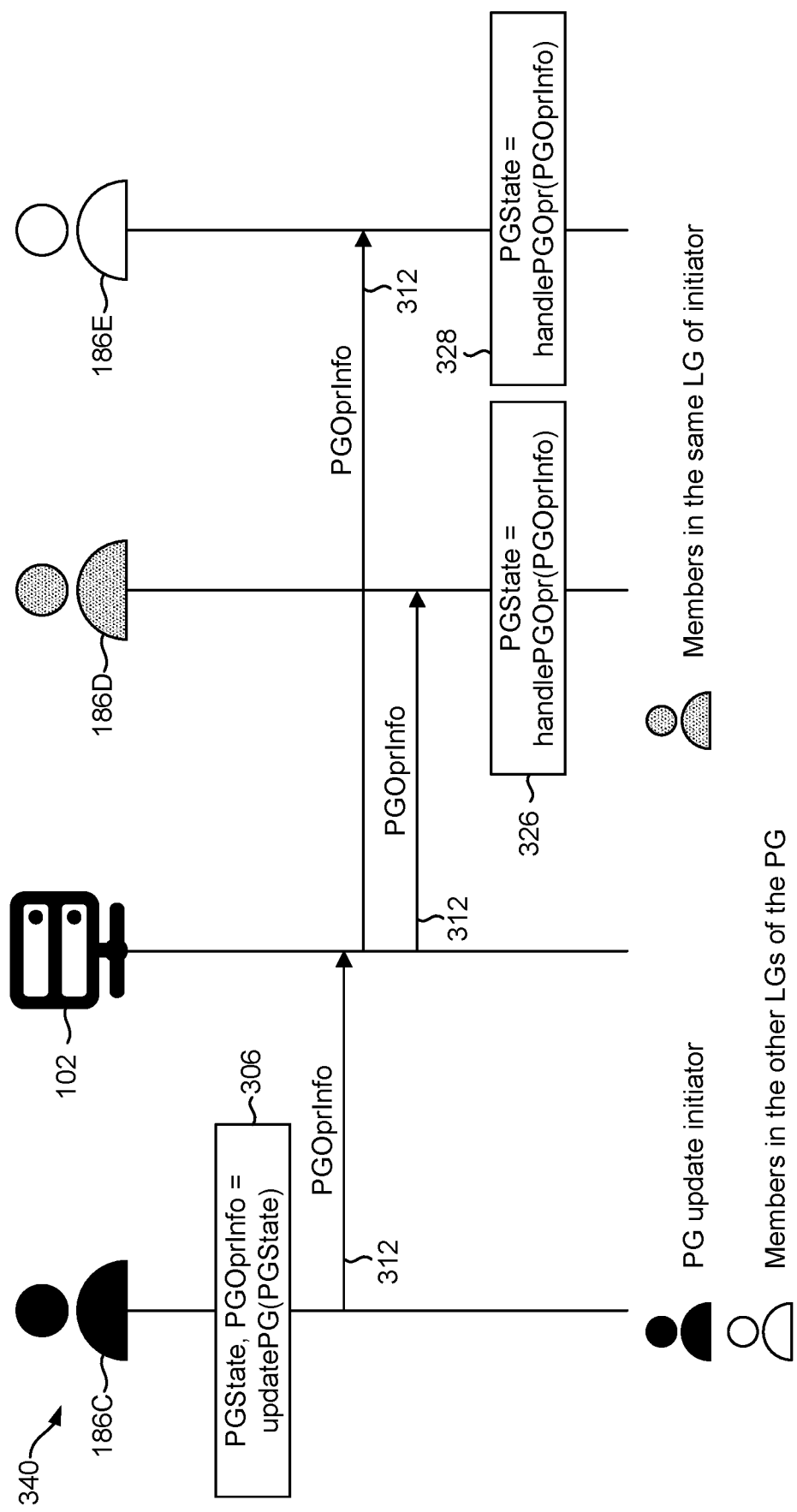
FIG. 13 is a sequence diagram showing an update-group process performed by a member of a local group for updating the public group of the two-tier architecture shown in FIG. 6.

FIG. 13 is a sequence diagram showing an update-PG process 340 performed by a member 186C of a local group 190B for updating the public group 220 that contains this local group 190B. This process 340 is similar to the operations of process 300 related to the updating of the public groups.

More specifically, the member 186C (such as member C21) updates the secret keys of the nodes of the public group 220 along the path from the corresponding leaf node to the root node thereof, by updating the path of this local group 190B in the public group 220 (that is, the path G'-H-J from the leaf node 226B to root node 222 through the intermediate node 224) by using for example, the updatePG function 306 with PGState, which returns PGOprInfo 312 of the public group 220.

The member 186C sends PGOprInfo 312 to members 186D (for example, C22, C23, and C24) of the same local group 190B of the initiator 186C via the server 102. The PGOprInfo sent to each member 186D comprises the secret key of the leaf node 226B.

The members 186D use the private key corresponding to the public key in the existing LGKP to apply the public-group update by using the handlePGOpr function 326.

The member 186C also sends PGOprInfo 312 to members 186E (for example, C11, C12, C13, C31, and C32) of other local groups 190A and 190C of the public group 220. The PGOprInfo sent to each member 186E comprises the secret key of the common node of the path G'-H-J from the leaf node G' of the public group 220 corresponding to the local group 186C to the root node 222 thereof and the path in the public group 220 from the leaf node corresponding to the local group 190A or 190C to the root node 222. For example, the PGOprInfo sent to the members of local group 190A comprises the secret key of node H of the public group 220.

The members 186E in other local groups of the public group 220 then apply the public-group update by using the handlePGOpr function 328.

Figure 14:
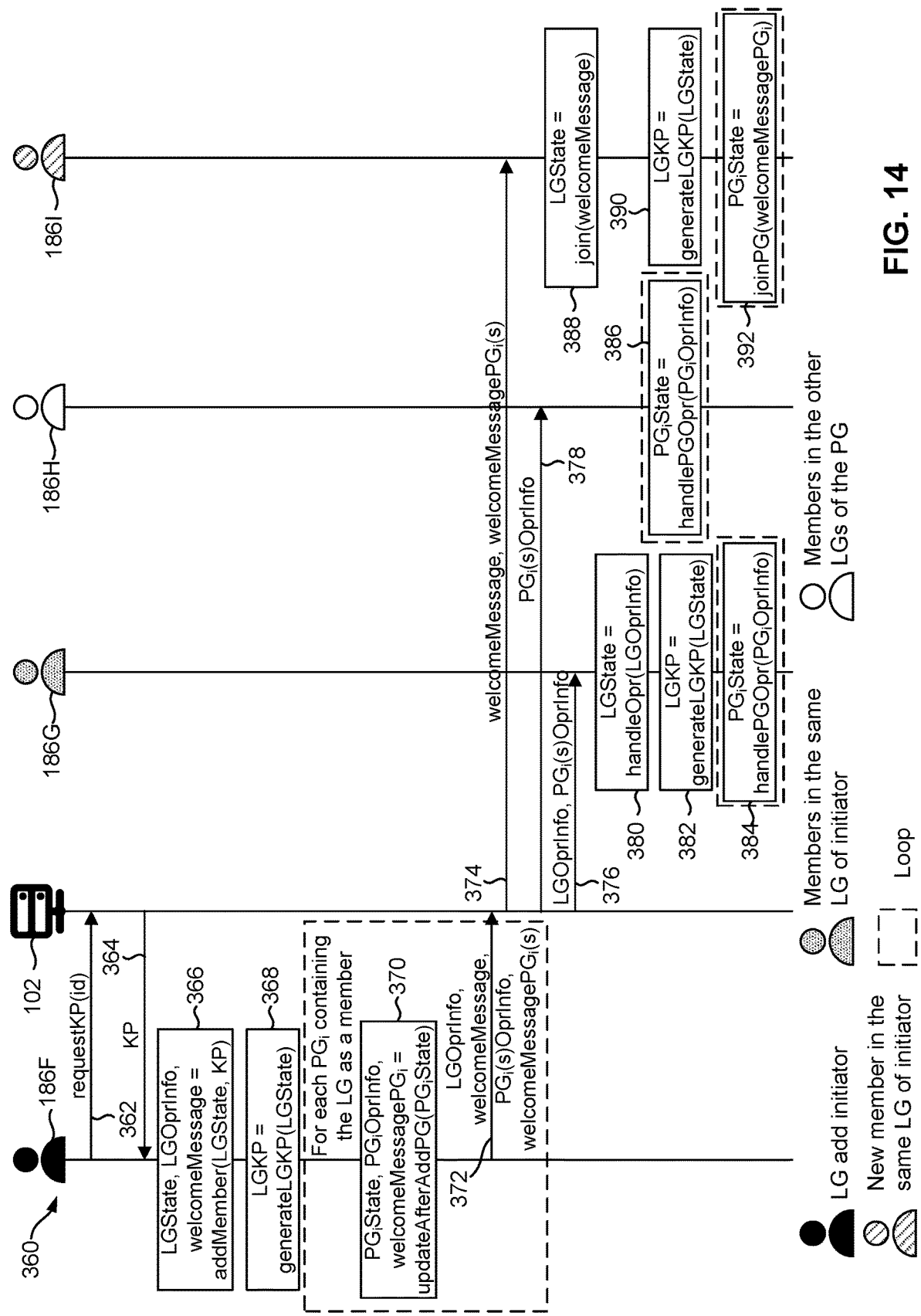
FIG. 14 is a sequence diagram showing an add-member process performed by a member of a local group for adding a new member to the local group of the two-tier architecture shown in FIG. 6.

FIG. 14 is a sequence diagram showing an add-member process 360 performed by a member 186F of a local group 190 for adding a new member 186I to the local group 190. In the following, the process 360 will be described with reference to an example shown in FIG. 15.

Figure 15:
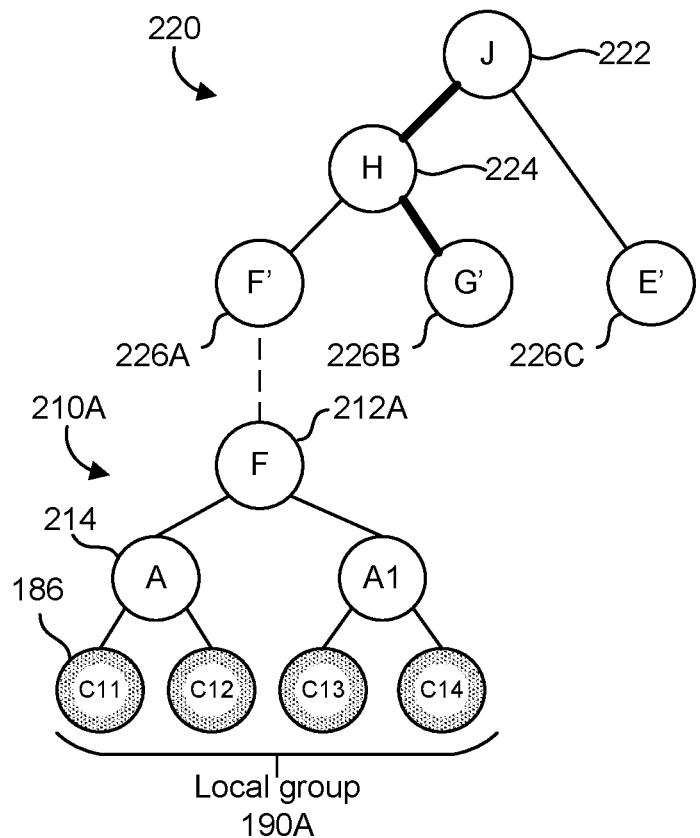
FIG. 15 shows an example of adding a new member to a local group of the two-tier architecture shown in FIG. 6 using the add-member process shown in FIG. 14.

As shown in FIGS. 14 and 15, the initiator 186F (for example, the member C11 of local group 190A) adds the new member 186I (for example, the member C14) to the initiator's copy of the LG tree 210A by associating the new member 186I with the first empty leaf node in the LG tree 210A or if the LG tree 210A has no empty nodes, adding a leaf node to the right-most leaf node of the LG tree 210A and associating the new member with the newly added leaf node. Herein, an empty node is a null node in the tree that is produced by removing a member from the group.

More specifically, the initiator 186F sends a request 362, requestKP, to the server 102 requesting for the KP of the new member 186I (that is, C14) by including the id of the new member 186I in the request. In response, sever 102 send the requested KP 364 to the initiator 186F. Then, the initiator 186F adds the new member 186I to the initiator's copy of LG tree 210A and updates the initiator's path from the leaf node C11 to the root node of the LG tree 210A (that is, regenerating the secret keys of the nodes along the initiator's path) by using, for example, an addMember function 366, which returns the updated LGState having the updated LG tree 210A, the LGOprInfo thereof, and a welcome message for other members of the local group 190A (denoted "welcomeMessage", which comprises the information of the LG tree 210A encrypted using the public key of the KP of the new member 186I).

The initiator 186F then generates the LGKP for the updated LG tree 210A by using, for example, a generateLGKP function 368.

For each public group $PG_i$ that contains the local group 190A, the initiator 186F updates the PG tree 220 thereof (that is, $PG_i$) and updates the secret keys of the nodes along its path in the PG tree 220 the group key thereof by using, for example, a updateAfterAddPG function 370, which returns $PG_i$State of the PG tree 220, $PG_i$OprInfo thereof, and a welcome message for $PG_i$ (denoted "welcomeMessagePG$_i$", which comprises the information of $PG_i$ encrypted using the LGKP of the updated LG tree 210A). In FIG. 14, the aggregation of the one or more $PG_i$OprInfo is denoted "$PG_i$(s)OprInfo" and the aggregation of the one or more welcomeMessagePG$_i$ is denoted "welcomeMessagePG$_i$(s)".

The initiator 186F then sends the LGOprInfo, welcomeMessage, $PG_i$OprInfo, and welcomeMessagePG$_i$(s) to the server 102. The server 102 forwards welcomeMessage and welcomeMessagePG$_i$(s) (collectively identified as 374) to the new member 186I, forwards LGOprInfo and $PG_i$(s)OprInfo (collectively identified as 376) to other members 186G (that is, C12 and C13) of local group 190A, and forwards $PG_i$(s)OprInfo 378 to members 186H of other local groups (such as local groups 190B and 190C).

Each member 186G (that is, C12 and C13) of local group 190A then applies the add/update operation of LG tree 210A and applies update to PG tree 220 by using handleOpr function 380 (which adds the new member 186I to member 186G's copy of LG tree 210A and then applies update to the LG tree 210A in a manner similar to the handleOpr function 322 in FIG. 11) to derive the updated LGState of LG tree 210A, uses generateLGKP function 382 to generate LGKP of the updated LG tree 210A, and uses handlePGOpr function 384 (similar to the handlePGOpr function 326 in FIG. 11) to apply update to the PG tree 220 and obtain the updated $PG_i$State thereof. In embodiments where there are multiple public groups, the handlePGOpr function 384 may be repeatedly used to update all associated public groups.

Each member 186H of other local groups update information of the PG tree 220 by using handlePGOpr function 386 (similar to the handlePGOpr function 328 in FIG. 11) to apply update to the PG tree 220 and obtain the updated $PG_i$State thereof. In embodiments where there are multiple public groups, the handlePGOpr function 386 may be repeatedly used to update all associated public groups.

The new member 186I uses a join function 388 (similar to the join function 256 in FIG. 7) with the welcomeMessage to join the local group 190A and create the LGState (having a copy of the corresponding LG tree). The new member 186I then uses a generateLGKP function 390 with the obtained LGState to generate the LGKP. The new member 186I further uses a joinPG function 392 with the welcomeMessagePG$_i$ to join the corresponding public group 220 and create the PGState (having a copy of the corresponding PG tree). In embodiments where there are multiple public groups, the joinPG function 392 may be repeatedly used with each welcomeMessagePG$_i$ to update all associated public groups.

Figure 16:
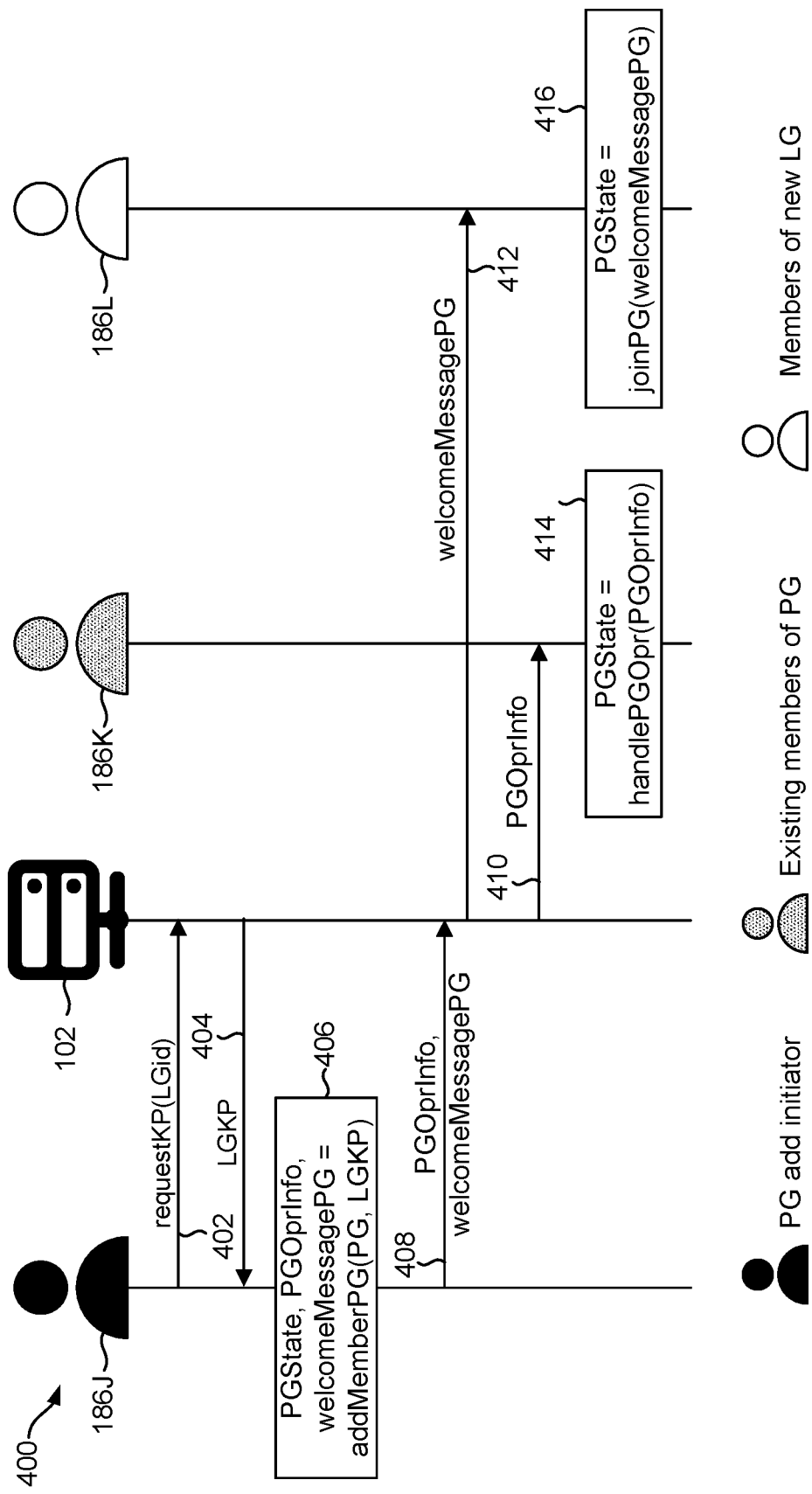
FIG. 16 is a sequence diagram showing an add-LG process performed by a member of a local group for adding a local group to the public group of the two-tier architecture shown in FIG. 6.

FIG. 16 is a sequence diagram showing an add-LG process 400 performed by a member 186J of a local group 190 for adding a local group 190D (having members 186L) to the public group 220. In the following, the process 400 will be described with reference to an example shown in FIG. 17.

Figure 17:
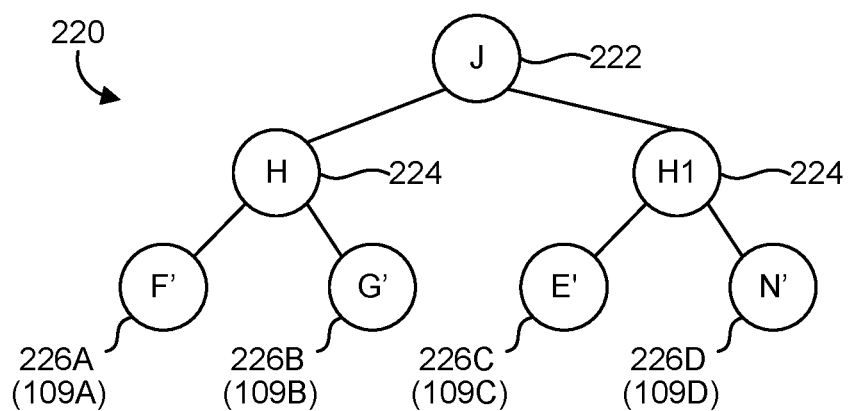
FIG. 17 shows an example of adding a local group to the public group of the two-tier architecture shown in FIG. 6 using the add-LG process shown in FIG. 16.

As shown in FIGS. 16 and 17, the initiator 186J (for example, the member C11 of local group 190A) associates the local group 190D with an empty PG leaf node of the PG tree 220, or adds a new PG leaf node 226D to the PG tree 220 and associate the local group 190D with the new leaf node 226D. The initiator 186J also updates its path from the leaf node 226A representing the local group 190A that the initiator 186J is associated therewith to the root node 222 of the public group 220.

More specifically, the initiator 186J sends a request 402, requestKP, to the server 102 requesting for the LGKP of the local group 190D by including the LGid of the local group 190D in the request. In response, sever 102 send the requested LGKP 404 to the initiator 186J. Then, the initiator 186J associates the local group 190D with an empty leaf node or a new leaf node 226D of the PG tree 220 and updates the PG tree 220 by using for example, an addMemberPG function 406, which returns the updated PGState of the PG tree 220, the PGOprInfo thereof, and a welcome message for the public group 220 (denoted "welcomeMessagePG", which comprises the information of the PG tree 220 encrypted using the public key in the LGKP of the local group 190D).

Then, the initiator 186J sends the PGOprInfo and welcomeMessagePG (collectively identified as 408) to the server 102. The server 102 forwards PGOprInfo 410 to members 186K of the local groups 190A, 190B, and 190C associated with the leaf nodes 226A, 226B, and 226C of the PG tree 220. Members 186K then apply update to their copies of PG tree 220 by using for example, a handlePGOpr function 414 (which adds the local group 190D to the PG tree 220 and apply update thereto in a manner similar to the handlePGOpr function 326 in FIG. 11).

The server 102 also sends welcomeMessagePG 412 to members 186L of the local group 190D. Members 186L then uses a joinPG function 416 (similar to the joinPG function 392 in FIG. 14) to join the public group 220 and builds its PG tree 220 by obtaining a PGState that comprises the group tree 220.

Figure 18:
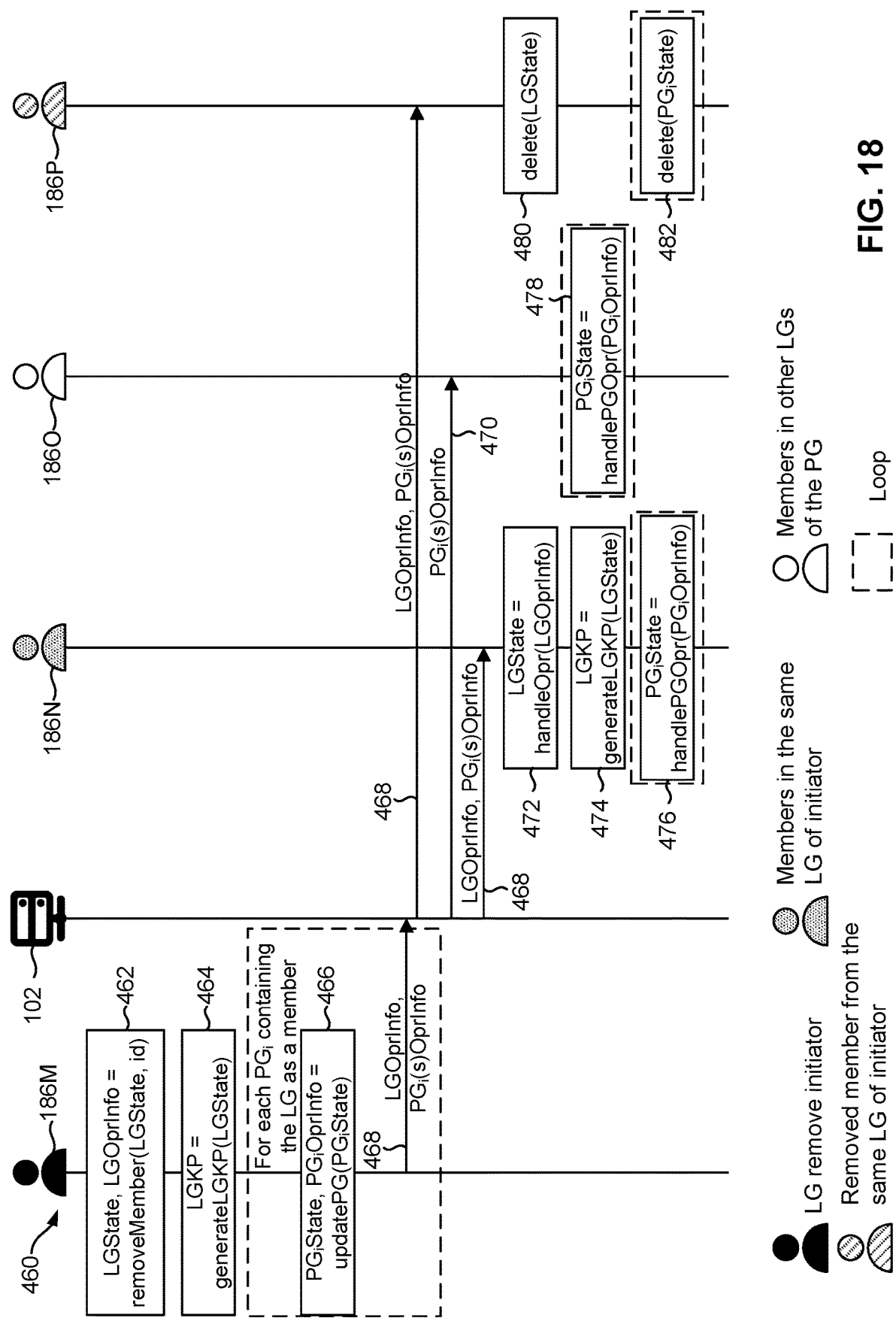
FIG. 18 is a sequence diagram showing a remove-member process performed by a member of a local group for removing another member from the local group of the two-tier architecture shown in FIG. 6.

FIG. 18 is a sequence diagram showing a remove-member process 460 performed by a member 186M of a local group 190 for removing a member 186P from the local group 190. In the following, the process 460 will be described with reference to an example shown in FIG. 19.

Figure 19:
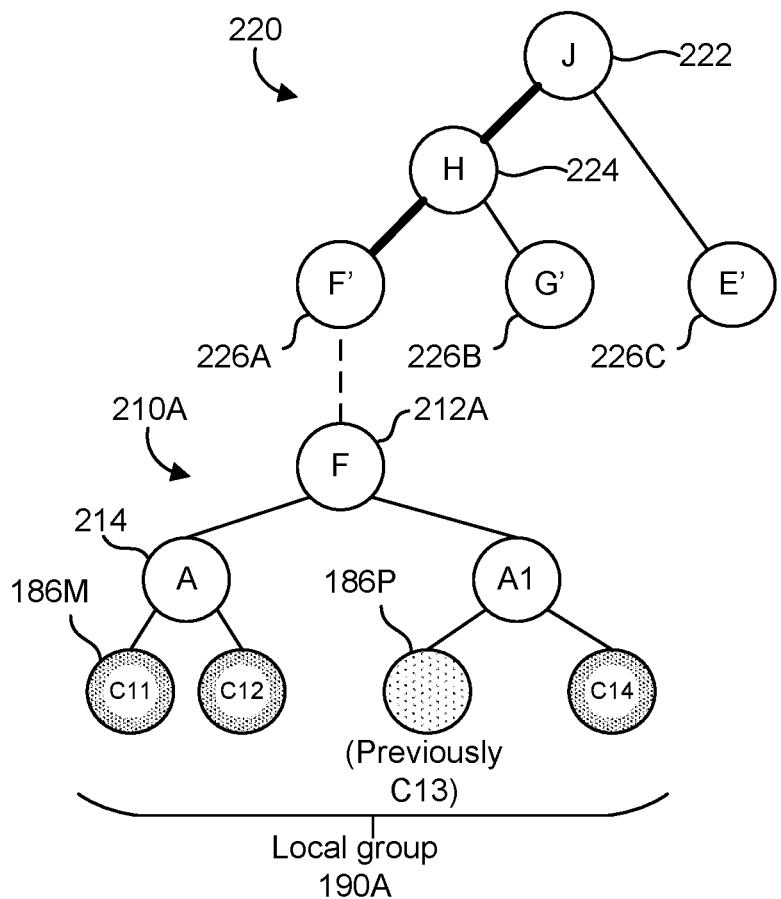
FIG. 19 shows an example of removing a member from a local group of the two-tier architecture shown in FIG. 6 using the remove-member process shown in FIG. 18.

As shown in FIGS. 18 and 19, the initiator 186M (for example, the member C11 of local group 190A) removes the member 186P (for example, the member C13) from the local group 190A by nullifying all nodes on its path from the leaf C13 to root 212A in the LG tree 210A.

More specifically, the initiator 186M removes the member 186P from the LG tree 210A and updates its path in the LG tree 210A by using for example, a removeMember function 462, which returns the updated LGState of the LG tree 210A and the LGOprInfo thereof.

The initiator 186M then generates the LGKP for the updated LG tree 210A by using for example, a generateLGKP function 464.

For each public group $PG_i$ that contains the local group 190A, the initiator 186M updates the PG tree 220 thereof (that is, $PG_i$) and updates the group key thereof by using for example, an updatePG function 466, which returns updated $PG_i$State and $PG_i$OprInfo of the PG tree 220. In FIG. 18, the aggregation of the one or more $PG_i$OprInfo is denoted "$PG_i$(s)OprInfo".

The initiator 186M then sends the LGOprInfo and $PG_i$(s)OprInfo (collectively identified as 468) to the server 102. The server 102 forwards the LGOprInfo and $PG_i$(s)OprInfo 468 to the member 186P and other members 186N (that is, C12 and C14) of local group 190A, and forwards $PG_i$(s)

OprInfo 470 to members 186O of other local groups (such as local groups 190B and 190C).

Other members 186N (that is, C12 and C14) of local group 190A then apply the remove operation of LG tree 210A by using handleOpr function 472 to remove the member 186P from their copies of LG tree 210A (nullifying the path of the member 186P) and apply update to the LG tree 210A using information in LGOprInfo, thereby obtaining the updated LGState of LG tree 210A. Other members 186N also use the generateLGKP function 474 to derive LGKP of the updated LG tree 210A. Other members 186N further apply a handlePGOpr function 476 to apply update to their copies of PG tree 220 and obtain the updated PG$_i$State thereof. In embodiments where there are multiple public groups, the handlePGOpr function 476 may be repeatedly used to update all associated public groups.

Members 186O of other local groups update PG tree 220 by using a handlePGOpr function 478 to apply update to their copies of PG tree 220 and obtain the updated PG$_i$State thereof. In embodiments where there are multiple public groups, the handlePGOpr function 478 may be repeatedly used to update all associated public groups.

The member 186P then uses a delete function 480 with the LGOprInfo to delete its copy of the LG tree 210A thereby deleting itself from the local group 190A. The member 186P also uses a delete function 482 with PG$_i$(s)OprInfo to delete its copy of the corresponding PG trees 220 that the local group 190A associated therewith thereby deleting itself from the corresponding public groups.

FIG. 20 is a sequence diagram showing a remove-LG process 500 performed by a member 186Q of a local group 190 for removing a local group (having members 186S) from the public group 220. In the following, the process 500 will be described with reference to an example shown in FIG. 21.

Figure 21:
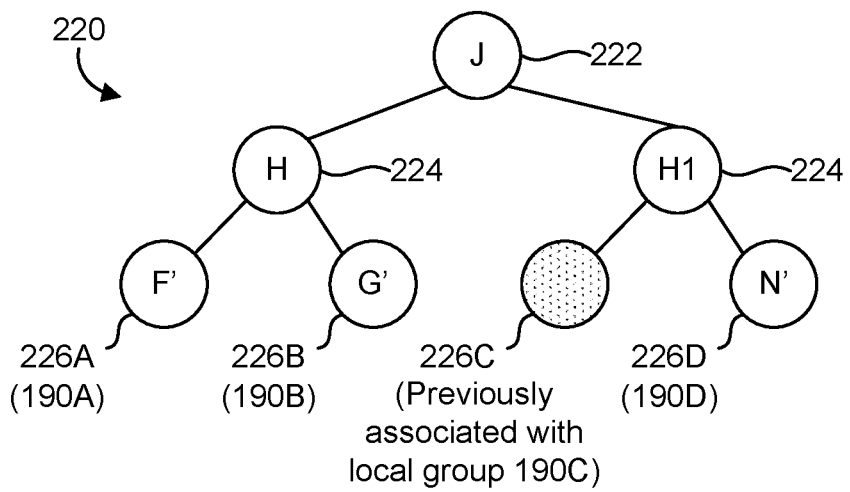
FIG. 21 shows an example of removing a local group from the public group of the two-tier architecture shown in FIG. 6 using the remove-LG process shown in FIG. 20.

As shown in FIGS. 20 and 21, the initiator 186Q (for example, the member C11 of local group 190A) removes the leaf node 226C (representing the local group 190C having members 186S) from the public group 220 by nullifying the path of the leaf node 226C (see below). The initiator 186Q also updates its path from the leaf node 226A representing the local group 190A that the initiator 186Q is associated therewith to the root node 222 of the public group 220.

More specifically, the initiator 186Q nullifies all nodes of the public group 220 on the path from the leaf node 226C to the root node 222 of the public group 220 and updates the initiator 186Q's path in the public group 220 (that is, regenerating the secret keys of the node along the path) by using, for example, a removeMemberPG function 502 with the id of the leaf node 226C, which returns the PGState and PGOprInfo of the PG tree 220.

Then, the initiator 186Q sends the PGOprInfo 504 to the server 102. The server 102 forwards PGOprInfo 504 to members 186R of the local groups 190A, 190B, and 190D of the public group 220. Members 186R then update their copies of PG tree 220 by using handlePGOpr function 506 (nullifying the path of the leaf node 226C and then applying update to the PG tree 220 in a manner similar to the handlePGOpr function 326 in FIG. 11).

The server 102 also forwards PGOprInfo 504 to members 186S of the local group 190C. Members 186S then remove themselves from the public group 220 by using the delete function 508 (similar to the delete function 482 in FIG. 18) to delete their copies of the PG tree of the public group 220.

By using above-described processes 300, 360, 400, 460, and 500, the system 100 may dynamically update and adjust the public and local groups with ease and flexibility.

The system 100 and the methods disclosed herein may be used in various end-to-end group messaging such as online collaborations.

For example, the system 100 and the methods disclosed herein may be used in online collaboration of a group of banks as a public group where each bank is a local group. With the two-tier architecture 200 disclosed herein, a bank employee or sender may send files having some content known only to all the employees of all banks (that is, to all employees of the public group using the group key of the public group) with some other content known only to employees from the same bank (that is, to the local group of the sender using the group key of the employee's local group). As those skilled in the art will appreciate, sending files is also a type of end-to-end group messaging between two members.

Any member (or administrator, based on application policy) in a bank may add/remove members to/from the bank. Added members may access the future bank messages and all banks' public messages (that is, messages for all employees of all banks). Removed members cannot access future bank messages and all banks' messages. Also, a member (or administrator, based on application policy) in a bank may add/remove other banks to/from the group of the banks. In addition, employees of a bank may have secure communication with members of other public groups that the bank is associated therewith. Therefore, the system and methods disclosed herein may be used in any companies and institutes to support thousands of local groups with secure communications therebetween.

While the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

What is claimed is:

1. A method of end-to-end group messaging, the method comprising:
    storing a first local-group (LG) tree in a memory of a first member of a first local group, the first local group comprising the first member and at least one other member, the first LG tree comprising a plurality of LG nodes, the plurality of LG nodes comprising a LG root node connecting to a plurality of LG leaf nodes, the LG root node associated with a LG group key of the first local group, and each of the first member and the at least one other member associated with a respective one of the LG leaf nodes and having a first path from the corresponding LG leaf node to the LG root node;
    storing, in the memory of the first member, a public-group (PG) tree for a public group, the public group comprising the first local group and at least one other local group, the PG tree comprising a plurality of PG nodes, the plurality of PG nodes comprising a PG root node connecting to a plurality of PG leaf nodes, the PG root node associated with a PG group key of the public group, and each of the first local group and the at least one other local group associated with a respective one of the PG leaf nodes and having a second path from the corresponding PG leaf node to the PG root node; and establishing communication between the first member and one or more members of the at least one other local group at least by using the PG group key.

2. The method of claim 1, further comprising:
establishing communication between the first member and the at least one other member at least by using the LG group key.

3. The method of claim 1, further comprising:
generating, by the first member, a first key package associated with the first member;
obtaining, by the first member, at least one second key package associated with the at least one other member;
creating, by the first member, the first LG tree based on the first and second key packages;
generating, by the first member and based on the information associated with the root node of the first LG tree, a third key package associated with the first LG tree; and
notifying, by the first member, the at least one other member to join the first local group.

4. The method of claim 1, further comprising:
retrieving, by the first member, a first key package associated with the first local group;
obtaining, by the first member, at least one other key package associated with the at least one other local group;
creating, by the first member, the PG tree based on the first and second key packages; and
notifying, by the first member, the one or more members of the at least one other local group to join the public group.

5. The method of claim 1, further comprising:
updating, by the first member, the LG nodes along the first path thereof,
generating, by the first member, a key package associated with the first LG tree;
updating, by the first member, the PG nodes along the second path of the first local group associated with the first member;
notifying, by the first member, the at least one other member to update the first local group and the public group; and
notifying, by the first member, the one or more members of the at least one other local group to update the public group.

6. The method of claim 1, further comprising:
updating, by the first member, the PG nodes along the second path of the first local group associated with the first member;
notifying, by the first member, the at least one other member to update the public group; and
notifying, by the first member, the one or more members of the at least one other local group to update the public group.

7. The method of claim 1, further comprising:
obtaining, by the first member, a first key package associated with a new member;
associating, by the first member, the new member with an empty LG leaf node of the first LG tree or a new LG leaf node of the first LG tree based on the first key package;
updating, by the first member, the LG nodes along the first path thereof;
generating, by the member and after said updating the LG nodes, a second key package associated with the first LG tree;
updating, by the first member, the PG nodes along the second path of the first local group associated with the first member;
notifying, by the first member and after said updating the PG nodes, the new member to join the first local group and the public group;
notifying, by the first member and after said updating the PG nodes, the at least one other member to update the first local group and the public group; and
notifying, by the first member, the one or more members of the at least one other local group to update the public group.

8. The method of claim 1, further comprising:
obtaining, by the first member, a key package associated with a second local group;
associating, by the first member, the second local group with an empty PG leaf node of the PG tree or a new PG leaf node of the PG tree;
updating, by the first member, the PG nodes along the second path of the first local group associated with the first member;
notifying, by the first member and after said updating the PG nodes, the members of the first local group and the at least one other local group to update the public group; and
notifying, by the first member and after said updating the PG nodes, one or more members of the second local group to join the public group.

9. The method of claim 1, wherein the first local group further comprises a second member; the method further comprising:
nullifying, by the first member, the LG nodes along the first path of the second member;
updating, by the first member, the LG nodes along the first path thereof,
generating, by the first member and after said updating the LG nodes, a key package for associating with the first local group;
updating, by the first member and after said updating the LG nodes, the PG nodes along the second path of the first local group associated with the first member;
notifying, by the first member, the second member to remove itself from the first local group and from the public group;
notifying, by the first member and after said updating the PG nodes, the at least one other member to update the first local group and the public group; and
notifying, by the first member and after said updating the PG nodes, the one or more members of the at least one other local group to update the public group.

10. The method of claim 1, wherein the public group further comprises a second group; the method further comprising:
nullifying, by the first member, the PG nodes along the second path of the second group;
updating, by the first member, the PG nodes along the second path of the first local group associated with the first member;
notifying, by the first member and after said updating the PG nodes, the at least one other member of the first local group and the one or more members of the at least one other local group to update the public group; and
notifying, by the first member and after said updating the PG nodes, one or more members of the second group to remove themselves from the public group.

11. An apparatus for executing instructions to perform actions of end-to-end group messaging, the actions comprising:
- storing a first local-group (LG) tree in a memory of a first member of a first local group, the first local group comprising the first member and at least one other member, the first LG tree comprising a plurality of LG nodes, the plurality of LG nodes comprising a LG root node connecting to a plurality of LG leaf nodes, the LG root node associated with a LG group key of the first local group, and each of the first member and the at least one other member associated with a respective one of the LG leaf nodes and having a first path from the corresponding LG leaf node to the LG root node;
- storing, in the memory of the first member, a public-group (PG) tree for a public group, the public group comprising the first local group and at least one other local group, the PG tree comprising a plurality of PG nodes, the plurality of PG nodes comprising a PG root node connecting to a plurality of PG leaf nodes, the PG root node associated with a PG group key of the public group, and each of the first local group and the at least one other local group associated with a respective one of the PG leaf nodes and having a second path from the corresponding PG leaf node to the PG root node; and
- establishing communication between the first member and one or more members of the at least one other local group at least by using the PG group key.

12. The apparatus of claim 11, wherein the actions further comprise:
- generating, by the first member, a first key package associated with the first member;
- obtaining, by the first member, at least one second key package associated with the at least one other member;
- creating, by the first member, the first LG tree based on the first and second key packages;
- generating, by the first member and based on the information associated with the root node of the first LG tree, a third key package associated with the first LG tree; and
- notifying, by the first member, the at least one other member to join the first local group.

13. The apparatus of claim 11, wherein the actions further comprise:
- retrieving, by the first member, a first key package associated with the first local group;
- obtaining, by the first member, at least one other key package associated with the at least one other local group;
- creating, by the first member, the PG tree based on the first and second key packages; and
- notifying, by the first member, the one or more members of the at least one other local group to join the public group.

14. The apparatus of claim 11, wherein the actions further comprise:
- updating, by the first member, the LG nodes along the first path thereof;
- generating, by the first member, a key package associated with the first LG tree;
- updating, by the first member, the PG nodes along the second path of the first local group associated with the first member;
- notifying, by the first member, the at least one other member to update the first local group and the public group; and
- notifying, by the first member, the one or more members of the at least one other local group to update the public group.

15. The apparatus of claim 11, wherein the actions further comprise:
- updating, by the first member, the PG nodes along the second path of the first local group associated with the first member;
- notifying, by the first member, the at least one other member to update the public group; and
- notifying, by the first member, the one or more members of the at least one other local group to update the public group.

16. The apparatus of claim 11, wherein the actions further comprise:
- obtaining, by the first member, a first key package associated with a new member;
- associating, by the first member, the new member with an empty LG leaf node of the first LG tree or a new LG leaf node of the first LG tree based on the first key package;
- updating, by the first member, the LG nodes along the first path thereof;
- generating, by the member and after said updating the LG nodes, a second key package associated with the first LG tree;
- updating, by the first member, the PG nodes along the second path of the first local group associated with the first member;
- notifying, by the first member and after said updating the PG nodes, the new member to join the first local group and the public group;
- notifying, by the first member and after said updating the PG nodes, the at least one other member to update the first local group and the public group; and
- notifying, by the first member, the one or more members of the at least one other local group to update the public group.

17. The apparatus of claim 11, wherein the actions further comprise:
- obtaining, by the first member, a key package associated with a second local group;
- associating, by the first member, the second local group with an empty PG leaf node of the PG tree or a new PG leaf node of the PG tree;
- updating, by the first member, the PG nodes along the second path of the first local group associated with the first member;
- notifying, by the first member and after said updating the PG nodes, the members of the first local group and the at least one other local group to update the public group; and
- notifying, by the first member and after said updating the PG nodes, one or more members of the second local group to join the public group.

18. The apparatus of claim 11, wherein the first local group further comprises a second member; and
wherein the actions further comprise:
- nullifying, by the first member, the LG nodes along the first path of the second member;
- updating, by the first member, the LG nodes along the first path thereof;
- generating, by the first member and after said updating the LG nodes, a key package for associating with the first local group;

updating, by the first member and after said updating the LG nodes, the PG nodes along the second path of the first local group associated with the first member;

notifying, by the first member, the second member to remove itself from the first local group and from the public group;

notifying, by the first member and after said updating the PG nodes, the at least one other member to update the first local group and the public group; and notifying, by the first member and after said updating the PG nodes, the one or more members of the at least one other local group to update the public group.

19. The apparatus of claim 11, wherein the public group further comprises a second group; and wherein the actions further comprise:

nullifying, by the first member, the PG nodes along the second path of the second group;

updating, by the first member, the PG nodes along the second path of the first local group associated with the first member;

notifying, by the first member and after said updating the PG nodes, the at least one other member of the first local group and the one or more members of the at least one other local group to update the public group; and notifying, by the first member and after said updating the PG nodes, one or more members of the second group to remove themselves from the public group.

20. A non-transitory computer-readable storage medium comprising computer-executable instructions for end-to-end group messaging, wherein the instructions, when executed, cause a processing structure to perform actions comprising:

storing a first local-group (LG) tree in a memory of a first member of a first local group, the first local group comprising the first member and at least one other member, the first LG tree comprising a plurality of LG nodes, the plurality of LG nodes comprising a LG root node connecting to a plurality of LG leaf nodes, the LG root node associated with a LG group key of the first local group, and each of the first member and the at least one other member associated with a respective one of the LG leaf nodes and having a first path from the corresponding LG leaf node to the LG root node;

storing, in the memory of the first member, a public-group (PG) tree for a public group, the public group comprising the first local group and at least one other local group, the PG tree comprising a plurality of PG nodes, the plurality of PG nodes comprising a PG root node connecting to a plurality of PG leaf nodes, the PG root node associated with a PG group key of the public group, and each of the first local group and the at least one other local group associated with a respective one of the PG leaf nodes and having a second path from the corresponding PG leaf node to the PG root node; and establishing communication between the first member and one or more members of the at least one other local group at least by using the PG group key.

\* \* \* \* \*